(12) United States Patent
Brule

(10) Patent No.: US 12,261,916 B2
(45) Date of Patent: Mar. 25, 2025

(54) DATA SENDING PROCESS

(71) Applicant: NOTHING2INSTALL, Marseilles (FR)

(72) Inventor: Sebastien Brule, Marseilles (FR)

(73) Assignee: NOTHING2INSTALL, Marseilles (FR)

( * ) Notice: Subject to any disclaimer, the term of this patent is extended or adjusted under 35 U.S.C. 154(b) by 0 days.

(21) Appl. No.: 17/629,735

(22) PCT Filed: Jul. 24, 2020

(86) PCT No.: PCT/EP2020/071048
§ 371 (c)(1),
(2) Date: Jan. 24, 2022

(87) PCT Pub. No.: WO2021/014020
PCT Pub. Date: Jan. 28, 2021

(65) Prior Publication Data
US 2022/0294862 A1  Sep. 15, 2022

(30) Foreign Application Priority Data
Jul. 24, 2019  (FR) .................................. 1908420

(51) Int. Cl.
*H04L 67/00* (2022.01)
*G06F 9/54* (2006.01)
*H04L 67/565* (2022.01)

(52) U.S. Cl.
CPC .............. *H04L 67/34* (2013.01); *G06F 9/543* (2013.01); *H04L 67/565* (2022.05)

(58) Field of Classification Search
CPC ....... H04L 67/00; H04L 67/34; H04L 67/561; H04L 67/565; G06F 9/54; G06F 9/543; G06F 9/4416; G06F 15/16; G06F 3/04847; A63F 13/60; A63F 13/537
USPC .......................................................... 709/203
See application file for complete search history.

(56) References Cited

U.S. PATENT DOCUMENTS

| | | | | |
|---|---|---|---|---|
| 8,612,374 B1 * | 12/2013 | Amdahl | ................. | H04L 67/06 |
| | | | | 705/400 |
| 9,836,195 B2 * | 12/2017 | Kodisoja | ................ | A63F 13/44 |
| 10,891,127 B2 * | 1/2021 | Ye | .......................... | G06F 16/148 |
| 2002/0111995 A1 * | 8/2002 | Mansour | ................... | H04L 9/40 |
| | | | | 709/213 |

(Continued)

FOREIGN PATENT DOCUMENTS

FR  2975554 A1  11/2012

OTHER PUBLICATIONS

International Search Report issued in corresponding International Application No. PCT/EP2020/071048, dated Sep. 16, 2020, pp. 1-2, European Patent Office, Rijswijk, Netherlands.

(Continued)

*Primary Examiner* — James N Fiorillo
(74) *Attorney, Agent, or Firm* — Studebaker Brackett PLLC

(57) ABSTRACT

A process for sending from at least one computer server to at least one computer terminal of at least one data item D having at least one first attribute A, with the at least one computer server being in communication with the said computer terminal, with the process including at least the following successive phases, at least one initialisation phase and at least one change phase.

22 Claims, 16 Drawing Sheets

(56) References Cited

U.S. PATENT DOCUMENTS

| | | | | |
|---|---|---|---|---|
| 2005/0102044 | A1* | 5/2005 | Kohn | G06F 17/11 700/28 |
| 2008/0046506 | A1* | 2/2008 | Broda | H04L 67/01 709/203 |
| 2011/0126198 | A1* | 5/2011 | Vilke | G06F 9/54 709/227 |
| 2012/0010901 | A1* | 1/2012 | Johnson | G16H 40/60 705/2 |
| 2012/0054263 | A1* | 3/2012 | Demant | G06F 9/54 709/203 |
| 2012/0082226 | A1* | 4/2012 | Weber | H04N 7/141 375/E7.246 |
| 2013/0007221 | A1* | 1/2013 | Venkat | H04L 67/02 709/219 |
| 2013/0246944 | A1* | 9/2013 | Pandiyan | G06F 9/54 715/760 |
| 2015/0029865 | A1* | 1/2015 | Drobinsky | H04L 47/12 370/238 |
| 2015/0199872 | A1* | 7/2015 | George | G07F 17/3237 463/31 |
| 2016/0019604 | A1* | 1/2016 | Kobayashi | H04N 21/47 705/14.73 |
| 2016/0050243 | A1* | 2/2016 | De Vleeschauwer | H04L 65/80 709/231 |
| 2016/0262694 | A1* | 9/2016 | Calcano | G01L 5/00 |
| 2016/0274780 | A1* | 9/2016 | Anai | G06Q 30/0251 |
| 2017/0060645 | A1* | 3/2017 | Gasselin de Richebourg | G06F 9/54 |
| 2017/0072317 | A1* | 3/2017 | Nishikawa | A63F 13/56 |
| 2017/0095737 | A1* | 4/2017 | Nishikawa | A63F 13/35 |
| 2017/0331925 | A1* | 11/2017 | Song | H04L 67/567 |
| 2018/0240100 | A1* | 8/2018 | Leleu | G06Q 20/4012 |
| 2019/0220273 | A1* | 7/2019 | Ye | G06F 9/44505 |
| 2020/0167355 | A1* | 5/2020 | Rath | G06F 16/2433 |
| 2020/0167360 | A1* | 5/2020 | Rath | G06F 16/278 |
| 2020/0167361 | A1* | 5/2020 | Princehouse | G06F 3/0649 |
| 2020/0249844 | A1* | 8/2020 | Poupet | G06F 3/0643 |

OTHER PUBLICATIONS

Written Opinion issued in corresponding International Application No. PCT/EP2020/071048, dated Sep. 16, 2020, pp. 1-7, European Patent Office, Rijswijk, Netherlands.

\* cited by examiner

| Server or transmission end | | | | | | | |
|---|---|---|---|---|---|---|---|
| Periods T | T0 | T1 | T2 | T3 | ... | Tn | T(n+1) |
| State (of commands or data) | | | | | | | |
| Position/Value | x0 | x1 | x2 | x3 | | xn | |
| Speed | v0=0 | v1 = (x1-x0)/T | v2 = (x2-x1)/T | v3 = (x3-x2)/T | | vn=(x(n)-x(n-1))/T | |
| Acceleration | a0=0 | a1 = (x1-x0)/T^2 (x1) | a2 = (v2-v1)/T^2 if (a2-a1)!=0 then send (a2-a1) | a3 = (v3-v2)/T^2 if (a3-a2)!=0 then send (a3-a2) | | a(n)=(v(n)-v(n-1))/T^2 if (a(n)-a(n-1))!=0 then send (a(n)-a(n-1)) | |
| Command to be sent at each period (Tn) | Send (x0) | | | | | | |

Fig. 19a

| Client or receiving side | T0 | T1 | T2 | ... | T(n-1) | Tn | T(n+1) |
|---|---|---|---|---|---|---|---|
| Periods T | | | | | | | |
| Commands received at T(n)=sending time | x0 | x1 | a2=a1 | | | a(n)=a(n-1) | |
| New state | | | | | | | |
| Predictive | | | | | | | |
| Acceleration | N/A | N/A | ap2=ac | | | ap(n)=ac(n-1) | ap(n+1)=ac(n) |
| Speed | N/A | N/A | vp2=vc1+ap2*T | | | vp(n)=vc(n-1)+ap(n)*T | vp(n+1)=vc(n)+ap(n+1)*T |
| Position/Value | N/A | N/A | xp2=xc1+vc1*T +1/2*ap2*T^2 | | | xp(n)=xc(n-1)+vc(n-1)*T +1/2*ap(n)*T^2 | xp(n+1)=xc(n)+vc(n)*T +1/2*ap(n+1)*T^2 |
| Correction | | | | | | | |
| Acceleration | | ac1=(x1-x0)/T^2 | ac2=ac1+(a2-a1) | | | ac(n)=ac(n-1)+(a(n)-a(n-1)) | |
| Position/Value | xc0=x0 | xc1=x1 | xc2=xc1+vc1*T +1/2*ap2*T^2 | | | xc(n)=xc(n-1)+vc(n-1)*T +1/2*ac(n)*T^2 | |
| Speed | | vc1=(x1-x0)/T | vc2=(xc2-xc1)/T | | | vc(n)=(xc(n)-xc(n-1))/T | |
| Action at Tn: use the predicted value as long as no command is received | Not applicable | N/A | Assign xp2 | | | Assign xp(n) | |
| Action when the command sent at Tn is received | Assign xc0 | Assign xc1 | if a2=a1, xc2=xp2: no correction applied, otherwise assign xc2. Save xc2. Save vc2. Save ac2. | | | If a(n)=a(n-1), xc(n)=xp(n): no correction applied, otherwise assign xc(n). Save xc(n). Save vc(n). Save ac(n). | |

Fig. 19b

| | Caption | |
|---|---|---|
| T | Server-end period | |
| T' | Client-end period (usually T=T') | |
| Tn | Start of the nth period T | |
| T'n | Start of the nth period T' | |
| Tn-T'n | Sending time | |
| N/A | Not Applicable | |
| | x(n) | Position/value at the period n |
| | v(n) | Speed at period n |
| | a(n) | Acceleration at period n |
| | xp(n) | Predictive position/value at period n |
| | vp(n) | Predictive speed at period n |
| | ap(n) | Predictive acceleration at period n |
| | xc(n) | Corrective position/value at period n |
| | vc(n) | Corrective speed at period n |
| | ac(n) | Corrective acceleration at period n |

Fig.19c

DATA SENDING PROCESS

The present application is a U.S. National Phase of International Application Number PCT/EP2020/071048, filed Jul. 24, 2020, which claims priority to French Application No. 1908420, filed Jul. 24, 2019.

TECHNICAL FIELD

The invention relates to the field of client-server architectures, operating system virtualisation and protocols for remote access to virtualised operating systems and applications.

STATE OF THE ART

Today's intelligent electronic devices generally include electronic components (processors, memories, communication interfaces, screens, external memories and sensors such as microphones, cameras, GPS, etc.), and software, the main part of which is known as the operating system, which in particular allow applications to be run on these devices.

Such devices are for example: modern mobile phones (smartphones), touch-screen tablets, desktop and laptop computers, game consoles and television reception terminals.

A significant part of the maintenance of these electronic devices involves the updating of their operating system and applications, as well as the support required for their use (troubleshooting, training).

Indeed: operating systems can be up to several gigabytes in size (usually between 10 and 30 GB), in particular in the case of consumer devices, which now provide access to the largest number of applications (including those providing access to services, in particular Internet browsers).

The combination of the operating system and one or more applications running on it consumes energy and memory in addition to that required to install them.

These demands force devices running these operating systems to contain sufficient power and memory (volatile and non-volatile).

This power and memory capacity is required to accommodate the operating system and certain applications, and also to be able to run the said applications with ever increasing performance.

This increase in power and memory poses many problems, especially for manufacturers, distributors of electronic devices and suppliers of applications for these devices.

These problems are multiple and range from the manufacturing costs of electronic devices, many of which are associated with the costs of memory components and computing power, and with the problems of power consumption.

There are also many issues for users. These include the perpetual maintaining of their devices, the stress inherent in the loss, theft or breakage of their devices, or the complex management of energy self-sufficiency and available disc space.

The beginning of a solution has appeared with the virtualisation of applications and mainly video games, which are not run on the user's computer terminal but rather on a remote computer server. In this client-server configuration, the computer server sends a video stream to the computer terminal which is then acting as a client so that the computer terminal acts only as a display device to provide visual rendering of an application running remotely on a server. This type of solution calls for a very high bandwidth between the server and the client, even though the video stream can be compressed, as well as significant power and investment in the computer server that must ensure the running and rendering of applications or video games, and then the encoding of this rendering into video format.

In addition, when the client wants to drive the application or the video game, it must send driving commands to the computer server, which has to run them, then convert the rendering of the application or video game into a video stream, which must then be sent and decompressed by the computer terminal. This results in serious latency problems but also in rendering quality.

This invention is intended to partially address at least some of these issues.

Abstract

This invention relates to a process for sending from at least one computer server to at least one computer terminal of at least one data item D having at least one first attribute A, with the said at least one computer server being in communication with the said computer terminal, typically through an at least partly wireless communication network, with the said process including at least the following successive phases:

i. At least one initialisation phase including at least the following steps:
  a. Receiving by the said computer terminal of the said data item D by the at least one computer server;
  b. Receiving, from at least one computer server, by the said computer terminal of a first state $A(n)$ of the said first attribute A, with the said first state $A(n)$ being associated with a first time-based data item designated as the first time $T(n)$;
  c. Use, in particular for display, by the said computer terminal of the said data item D according to the first state $A(n)$ of the said first attribute A at the first time $T(n)$;
  d. Receiving by the said computer terminal:
    of a second state $A(n+1)$ of the said first attribute A corresponding to a second time $T(n+1)$ from at least one computer server,
    Then, calculation by the said computer terminal of a first change parameter $E(n)$ of the said first attribute A depending on $A(n)$ and $A(n+1)$;
    or,
    of the first change parameter $E(n)$ of the said first attribute A from at least one computer server,
    Then, calculation by the said computer terminal of the second state $A(n+1)$ depending on $A(n)$ and $E(n)$;

ii. At least one change phase including at least the following steps:
  Use by the said computer terminal of the said data item D according to the second state $A(n+1)$ of the said first attribute A at the second time $T(n+1)$;
  Then, calculation by the said computer terminal of a third state $A(n+2)$ of the said first attribute A corresponding to a third time $T(n+3)$ depending on $A(n)$ and/or $A(n+1)$, and $E(n)$;
  Then, use by the said computer terminal of the said data item D according to the third state $A(n+2)$ of the said first attribute A at the third time $T(n+2)$.
  Or,
  Receiving by the said computer terminal of a second change parameter $E(n+1)$ of the said first attribute A from at least one computer server, where $E(n+1)$ is different from $E(n)$;
  Then, Calculation by the said computer terminal of a third state $A(n+2)$ of the said first attribute A corresponding to a third time T(n+2) depending on A(n) and/or A(n+1), and E(n+1);

Then, use by the said computer terminal of the said data item D according to the third state A(n+2) of the said first attribute A at the third time T(n+2).

Or,

Receiving by the said computer terminal of a third state A(n+2) of the said first attribute A at the third time T(n+2) from at least one computer server, where A(n+2) is different from A(n+1);

Then, use by the said computer terminal of the said data item D according to the third state A(n+2) of the said first attribute A at the third time T(n+2).

Then, preferably, calculation by the said computer terminal of a third change parameter E(n+1) of the said first attribute A depending on A(n+1) and A(n+2);

Then, preferably, calculation by the said computer terminal of the fourth stage A(n+3) of the said first attribute A at the fourth time T(n+3) depending on A(n+2) and E(n+1)

Use, preferably, by the said computer terminal of the said data item D according to the fourth state A(n+3) of the said first attribute A at the fourth time T(n+3).

The use by the said computer terminal of the said data item D is preferably taken from at least: displaying of the said data item D through a display device, storing of the said data item D through a storage device, analysing of the said data item D through an analysis device.

The system proposed by the invention is thus a client-server architecture for operating system and application virtualisation intended for electronic devices and using a predictive process of data sending and compression with decreased latency, optimising the network bandwidth requirements between the server and its clients (electronic devices).

The terminal only needs to receive either the change parameter or a subsequent state. It then deduces all the intermediate states following an initial state, and can then calculate all subsequent states in succession. This calculation is interrupted when the terminal receives new information from the computer server that will cause the terminal to change the calculation of subsequent states. This new information may be a new change parameter or a new state of the attribute.

This invention thus reduces the bandwidth consumption of the communication network between the computer terminal and the computer server. Indeed, this invention reduces the amount of information to be sent in comparison with the prior art.

This invention reduces the sending latency, as it can cancel it during the phases in which the terminal deduces successive states from previous states.

This invention reduces or even eliminates latency through its clever data sending process.

This invention decreases the power consumption of computer terminals since computer terminals have a much lower system resource requirement than in the prior art.

By hosting the operating system and applications on the computer server(s), this invention reduces the memory space requirement of the terminal compared to prior art solutions in which the operating system and applications are hosted on the terminal.

This invention makes it possible to maintain the version of the current applications since they are run on one or more computer servers, which is therefore transparent at the user terminal. The user terminal then appears only as a means of display and interaction with an application located on a computer server. This invention thus facilitates the updating and maintaining of the operating system and applications.

Finally, this invention provides for a very high rendering quality compared to the prior art due to its clever process of minimising data sending, preferably while still allowing the terminal to accurately deduce the actual states in many cases.

Indeed, beyond data compression, this invention reduces the amount of data to be sent for a rendering quality equivalent to current solutions. This invention thus offers a particularly effective solution to the latency problems encountered with known application virtualisation solutions.

This invention also relates to a process for sending from at least one computer server to at least one computer terminal of at least one data item D having at least one first attribute A, with the said at least one computer server being in communication with the said computer terminal, with the said process including at least the following successive phases:

i. At least one initialisation phase including at least the following steps:
   a. Receiving by the said computer terminal and from at least one computer server of at least:
      the said data item D;
      a first state A(n) of the said first attribute A corresponding to a first time T(n);
   b. Use by the said computer terminal of the said data item D according to the first state A(n) of the said first attribute A at the first time T(n);
   c. Receiving by the said computer terminal:
      of a second state A(n+1) of the said first attribute A corresponding to a second time T(n+1) from at least one computer server,
      Then, calculation by the said computer terminal of a first change parameter E(n) of the said first attribute A depending on A(n) and A(n+1);
      or,
      of the first change parameter E(n) of the said first attribute A from at least one computer server,
      Then, calculation by the said computer terminal of the second state A(n+1) depending on A(n) and E(n);

ii. At least one change phase including at least one iteration of the following steps:
   a. Use by the said computer terminal of the said data item D according to the second state A(n+1) of the said first attribute A at the second time T(n+1);
   b. Then, calculation by the said computer terminal of a third state A(n+2) of the said first attribute A corresponding to a third time T(n+2) depending on A(n) and/or A(n+1), and E(n);
   c. Then, use by the said computer terminal of the said data item D according to the third state A(n+2) of the said first attribute A at the third time T(n+2).
   d. During the steps of the change phase, with the first change parameter E(n) being changed to a second change parameter E(n+1), if:
      the said computer terminal receives a second change parameter E(n+1) of the said first attribute A from at least one computer server, where E(n+1) is different from E(n); the said calculation by the said computer terminal of the third state A(n+2) corresponding to the third time T(n+2) then depending on A(n) and/or A(n+1) and E(n+1);
   e. In the change phase steps, with the second state A(n+1) being changed to a third state A(n+2), and the first change parameter E(n) being changed to a second change parameter E(n+1) if:

the said computer terminal receives from the at least one computer server, a third state A(n+2) of the said first attribute A corresponding to a third time T(n+2), the change phase then comprising the calculation of a second change parameter E(n+1) of the said first attribute A, depending on A(n+1) and A(n+2).

And wherein the use by the said computer terminal of the said data item D is preferably taken from at least: displaying of the said data item D through a display device, storing of the said data item D through a storage device, analysing of the said data item D through an analysis device.

This invention also relates to a computer program product, preferably saved on a non-transitory medium, comprising instructions, which when performed by at least one processor and a computer runs the process according to this invention.

This invention also relates to an electronic circuit comprising a plurality of electronic components configured to run a series of commands implementing the process according to this invention.

This invention also relates to a computer terminal including at least one electronic circuit according to this invention.

This invention also relates to a system including at least one computer terminal according to this invention and at least one computer server, the said computer terminal and the said computer server being in communication with each other.

This invention also relates to a computer program product, preferably saved on a non-transitory medium, comprising instructions, which when performed by at least one of the processors and one computer, cause the at least one of the processors and the computer to send a series of commands to at the least one electronic circuit according to the present invention.

This invention relates to a system comprising a client-server architecture for virtualising operating systems and applications on remote servers, and making them remotely accessible to clients through a sending process according to this invention.

This invention relates to a process of optimised sending of streams that transit between the server and the client.

Advantageously, this invention decreases the size, manufacturing costs, power consumption, and distribution and maintenance costs of consumer or professional electronic devices while improving the experience of their users (mobile phones, tablets, personal computers, television screens and set-top boxes, game consoles, vehicle electronics, advertising displays, by way of example).

Cleverly, this invention allows existing devices to benefit from its implementation. Indeed, this invention is applicable to existing electronic devices.

BRIEF DESCRIPTION OF THE FIGURES

The purposes, aims and features and benefits of the invention will become clearer from the detailed description of one embodiment thereof which is shown by the following accompanying drawings in which:

FIG. 19a represents a summary table of at least a part of the process steps on the computer server side in one embodiment of this invention.

FIG. 19b represents a summary table of at least a part of the process steps on the terminal side in one embodiment of this invention.

FIG. 19c represents the caption for FIGS. 19a and 19b in one embodiment of this invention.

Figure 1:
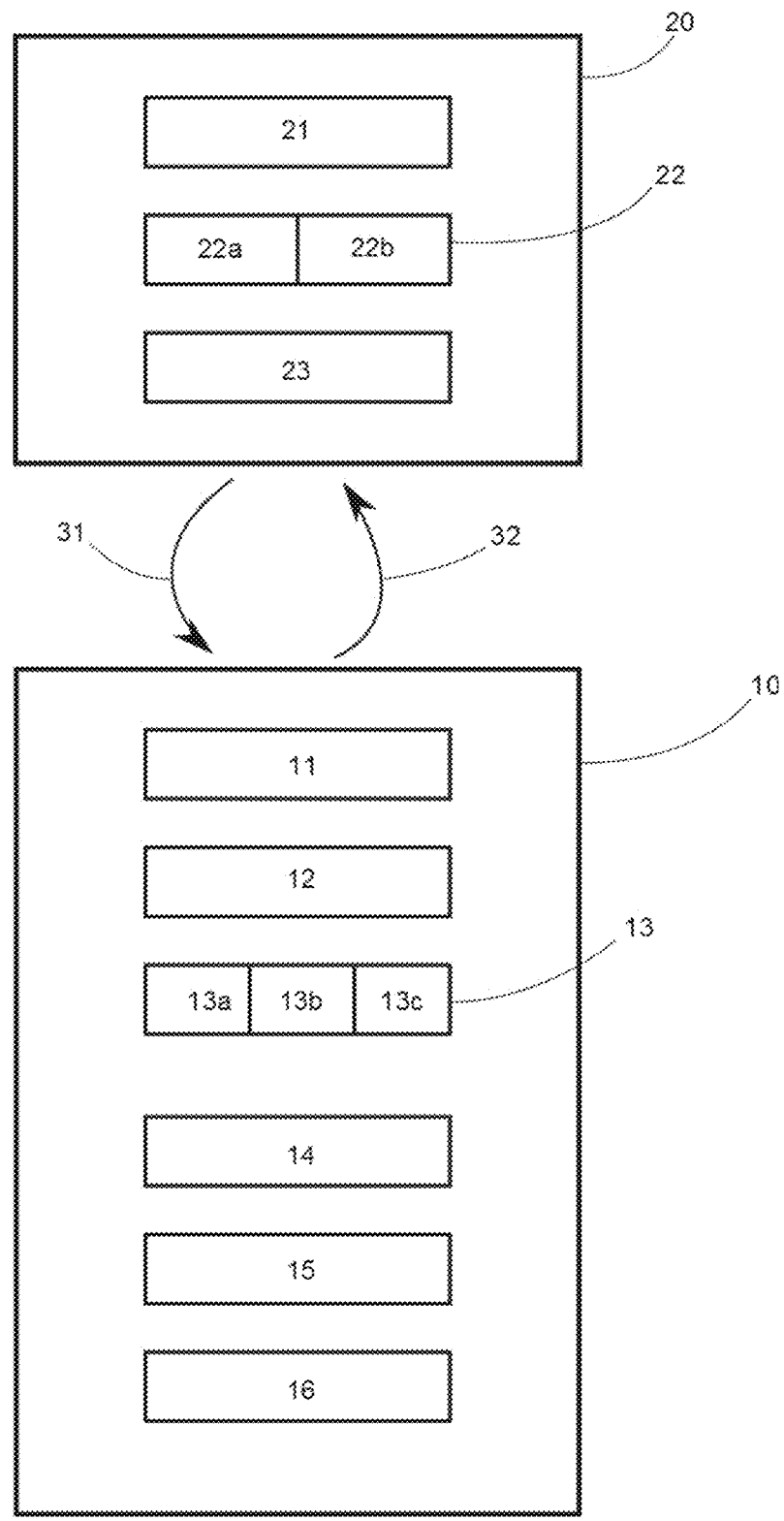
FIG. 1 represents a system according to the prior art.

The drawings are given as examples and do not place any limit on the invention. They are schematic diagram representations intended to facilitate understanding of the invention and are not necessarily on the scale of practical applications. In particular, the dimensions are not representative of reality.

DETAILED DESCRIPTION

Before beginning a detailed review of embodiments of the invention, optional features are set forth below which may optionally be used in combination or alternatively.

In one embodiment, the use by the said computer terminal of the said data item D includes at least one step of displaying said data item D, preferably the said computer terminal including at least one display device configured to display the said data item D.

In one embodiment, the use by the said computer terminal of the said data item D includes at least one step of storing the said data item D, preferably the said computer terminal including at least one storage device configured to store the said data item D, preferably on a non-transitory medium.

In one embodiment, the use by the said computer terminal of the said data item D includes at least one step of analysing the said data item D, preferably the said computer terminal including at least one analysis device configured to analyse the said data item D.

A terminal or computer terminal is an electronic system or device, also known as a client. Such a terminal is able to receive data sent from, for example, a computer server. Such a terminal may thus include one of the following: a display device, a storage device or an analysis device. The computer terminal is thus capable, preferably and in one embodiment, of: display a data item and/or save a data item and/or analyse a data item.

In one embodiment, said data item is taken from at least: a pixel, a voxel, a numerical value, an object, an image, etc.

In one embodiment, the said at least one first attribute A is taken from at least: a position, a speed, an acceleration, a colour taken from a range of colours, a transparency coefficient, etc.

In one embodiment, the first state, the second state and the third state are taken from at least: a numerical value, spatial coordinates, a speed vector, an acceleration vector, a colour taken from a range of colours, a transparency coefficient, etc.

In one embodiment, the change parameter is taken from at least: a speed, an acceleration, a trajectory, etc.

In one embodiment, the first change parameter $E(n)$ is equal to $(A(n+1)-A(n))/(T(n+1)-T(n))$, preferably taking the first derivative of $(A(n+1)-A(n))/(T(n+1)-T(n))$ with respect to T.

In one embodiment, the second state $A(n+1)$ is equal to $E(n)*(T(n+1)-T(n))+A(n)$, preferably taking the integral of $E(n)*(T(n+1)-T(n))+A(n)$, where T ranges from $T(n)$ to $T(n+1)$.

In one embodiment, the third state $A(n+2)$ is equal to $E(n+1)*(T(n+2)-T(n+1))+A(n+1)$, preferably taking the integral of $E(n+1)*(T(n+2)-T(n+1))+A(n+1)$, where T ranges from $T(n+1)$ to $T(n+2)$.

In one embodiment, the first change parameter $E(n+1)$ is equal to $(A(n+2)-A(n+1))/(T(n+2)-T(n+1))$, preferably taking the first derivative of $(A(n+2)-A(n+1))/(T(n+2)-T(n+1))$ with respect to T.

In one embodiment, the third state $A(n+2)$ is equal to $E(n)*(T(n+2)-T(n))+A(n)$, preferably taking the integral of $E(n)*(T(n+2)-T(n))+A(n)$, where T ranges from $T(n)$ to $T(n+2)$.

In one embodiment, the first change parameter $E(n+1)$ is equal to $(A(n+2)-A(n))/(T(n+2)-T(n))$, preferably taking the first derivative of $(A(n+2)-A(n))/(T(n+2)-T(n))$ with respect to T.

In one embodiment, $A(n+1)$ is between $A(n)$ and $A(n+2)$.

In one embodiment, the step of receiving by the said computer terminal the said data item D1 from at least one computer server and the step of receiving by the said computer terminal a first state $A(n)$ of the said first attribute A corresponding to the first time $T(n)$ from at least one computer server are performed in one and the same step.

In one embodiment, this process comprises a resynchronisation phase including at least the following steps:
  i. Receiving by the said computer terminal of the said data item D1 from at least one computer server;
  ii. Receiving by the said computer terminal of a state $A(n+m)$ of the said first attribute A corresponding to a time $T(n+m)$ from at least one computer server;
  iii. Use by the said computer terminal 10 of the said data item D1 according to the state $A(n+m)$ of the said first attribute A at the time $T(n+m)$;
  iv. Receiving by the said computer terminal:
    of a state $A(n+m+1)$ of the said first attribute A corresponding to a time $T(n+m+1)$ from at least one computer server,
    Then, calculation by the said computer terminal of a change parameter $E(n+m)$ of the said first attribute A depending on $A(n+m)$ and $A(n+m+1)$;
    or,
    of a change parameter $E(n+m)$ of the said first attribute A from at least one computer server,
    Then, calculation by the said computer terminal of the state $A(n+m+1)$ depending on $A(n+m)$ and $E(n+m)$.

In one embodiment, this process comprises a compression phase including at least the following steps:
  i. At least one initialisation sub-phase comprising:
    a. Saving, in at least one memory, of a first value corresponding to the first value of the plurality of data,
    b. Saving, in at least one memory, of a second value corresponding to the acceleration of the second value of the plurality of data,
  ii. At least one constant acceleration sub-phase comprising:
    a. Monitoring of the value of the said acceleration or its variation,
    b. Monitoring of a number which represents the number of positions during which the said acceleration remains constant, with the number of positions corresponding to the number of consecutive data items of the plurality of data having a constant acceleration.
    c. Saving, in at least one memory, of a third value corresponding to the said number of positions during which the acceleration remains constant.
  iii. At least one acceleration change phase comprising:
    a. Monitoring of the value of the new acceleration or its variation
    b. The next value is equal to the new acceleration or its variation from the previous acceleration value,
    c. Saving, in at least one memory, of a fourth value corresponding to the said new acceleration.

In a conventional system as shown in FIG. 1, using a computer terminal 10, for example a smartphone, the operating system 13a and the applications 13b are installed, often from a copy downloaded from at least one computer server 20 through a communication network such as the Internet, and are run locally on the computer terminal 10 by means of its processor 12.

This computer terminal 10, from the prior art, comprises a display device 11, a processor 12, a memory 13 storing among other things the operating system 13a, the applications 13b, and the user's personal data 13c, for example. This computer terminal 10 also has a battery 14, a user interface 16 and a communication module 15, in particular for sending 32 and receiving 31 data to and from at least one computer server 20.

The term display device refers to any device capable of displaying data in one way or another, with a display device as defined in this invention preferably being a computer screen, a television screen or even a smartphone.

This computer terminal 10 is, for example, one of the following terminals: a mobile phone, tablet, personal computer, TV screen and set top box, game console, vehicle electronics or advertising screen.

This computer server 20, also from the prior art, comprises a processor 21, a memory 22 hosting installation files 22a and update files 22b, with these files (22a, 22b) being intended to be downloaded from the computer server 20 to the computer terminal 10 for installation.

Users will thus often send a request to download an installation file 22a, for example, to the computer server 20, and then the computer terminal 10 will download this file 22a, generally representing a non-negligible amount of data and thus load on the communication network bandwidth of the computer terminal 10. In addition, the file 22a will then be saved to the memory 13 of the computer terminal 10 before being installed therein. It should be noted that all these steps also require a significant amount of power from the battery 14.

It can then easily be understood that in the prior art, the communication network is extensively used, as is the memory space of the computer terminal 10 or even its battery 14.

Figure 2:
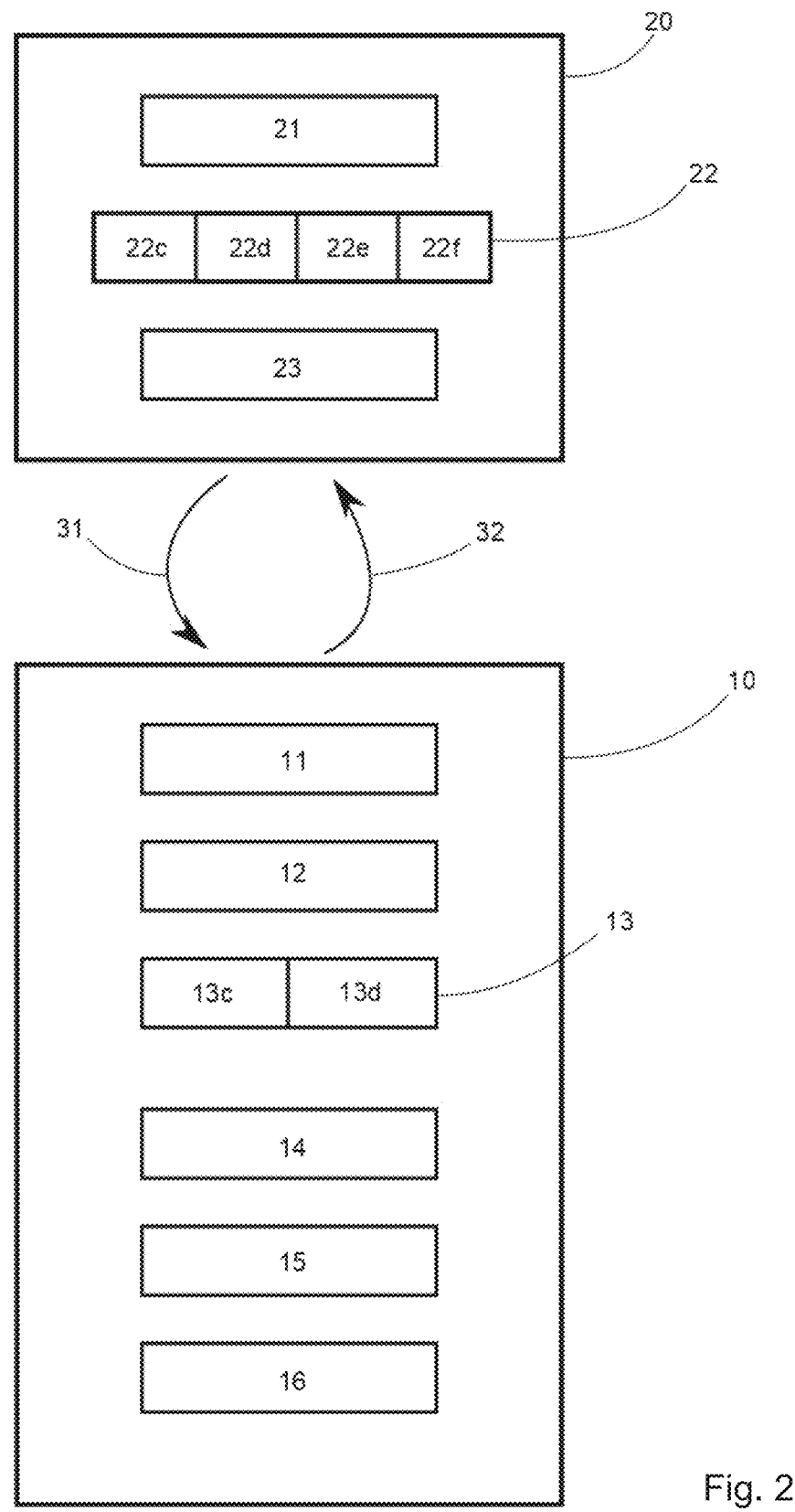
FIG. 2 represents a system in one embodiment of this invention.

FIG. 2 shows a system in one embodiment of this invention.

According to this invention, the computer terminal 10 substantially comprises the same components as before with the exception of, among other things, the operating system 13a and the applications 13b which are not stored in the memory 14 of the computer terminal 10. Indeed, the memory 14 of the computer terminal 10 now includes some user personal data 13c and a system client part 13d. This client part 13d is configured to communicate through the communication module 15 with a system server part 22d hosted by the computer server 20. This computer server 20 further includes the operating system 22e of the computer terminal 10 as well as the various applications 22f of the computer terminal 10. It should be noted that the computer server 20 may or may not host installation files 22a or update files 22b. However, in one embodiment of this invention, the major part of these files (22a, 22b) is intended to be used by the computer server 20 itself and not to be downloaded by the computer terminal 10. The communication network between the computer terminal 10 and the computer server 20 may be of any type. It may be, for example, a wireless or at least partly wireless network. It may, for example, include a wired part and a wireless part. Alternatively, it may be a hard-wired network.

The computer server 20 can thus locally perform updates and install new applications. An installation file may, however, be downloaded by the computer terminal 10 in order to install or update, for example, the client part 13d of the system.

According to this invention, the computer server 20 thus hosts and is capable of running one or more so-called virtualised Operating Systems 22e and one or more applications 22f installed thereon. It should be noted that this invention allows the use of already existing operating systems 22e or applications 22f. Contrary to the prior art, however, they are implemented locally on the computer server 20 and not on the computer terminal 10.

The applications 22f installed on the computer server 20 thus access the various elements, modules and drivers, of the computer terminal 10 and its interfaces, preferably through virtual drivers providing, through the virtualised Operating System 22e, the same software interfaces as that of the same Operating System 13a if the latter was installed locally on the computer terminal 10.

Thus, and advantageously, the applications 22f used do not need to be changed from those developed for prior art systems.

Access to the drivers of the modules of the computer terminal 10 is preferably through a Command and Data stream transiting over a two-way network (which may be the Internet or a private network) or one-way communication network (e.g., satellite, cable, or terrestrial transmission).

In contrast to the prior art, the volume of data and commands transiting is very low, as only basic commands and data are involved, not entire applications. This invention thus reduces the bandwidth required for the operation of the computer terminal 10.

It should be noted that some virtualisation solutions already exist, but suffer from many problems. Indeed, in the prior art, the computer server 20 will often run an operating system and applications locally and will receive and run commands it receives from the computer terminal 10, and send the computer terminal 10 the graphical rendering of these commands in the applications running in the virtualised operating system, which amounts to sending an image, with each image representing the display that users would have if the operation were carried out on their computer terminal 10. The amount of information is also substantial and requires a sufficiently large bandwidth.

In an embodiment, the virtualised operating system is displayed and applications are located on the computer terminal 10, which is then only used for sending commands to the computer server 20 and for displaying large amounts of data sent by the computer server 20.

So-called game streaming or video interface solutions are available from VMware, Microsoft, NVIDIA, Gamefly and other market players.

The proposed techniques are based on:
i. either on the regular sending of static images with levels of compression and quality loss attempting to match the communication network bandwidth,
ii. or on systems that continuously render the remote graphical interfaces on the computer server 20 and then encode them in video format for sending to the computer terminal 10, such systems being the ones that are increasingly used today. These are the systems that are used by most recognised game streaming solutions.

These techniques explain both the loss of quality of the remote rendering when the communication network is not of the very high speed type and also the latencies observed, as they add a complex processing stage at the computer servers which first have to perform a graphic rendering calculation before sending it in the video format, and then perform video decoding on the computer terminal 10.

All these techniques therefore also give rise to increasingly higher computing and power resource requirements and costs on computer servers, since they require both graphic interfaces and low-latency video encoders.

Again, and in contrast to the prior art, one embodiment of this invention does not send from the computer server 20 to the computer terminal 10 any images or video frames for display thereof on the display device 11 of the computer terminal 10.

As will be explained below, this invention makes it possible to match Command and Data baud rates to consumer communication networks, and not only to very high speed and very high quality of service communication networks.

For this purpose, the invention proposes a new process for sending data and commands.

Indeed, based on this invention, the system needs a much lower bandwidth than the one required in prior art solutions. This invention can provide operation that is high performance with very low, or even zero latency, and a rendering quality identical to that offered by the most efficient current systems, while using a lower bandwidth.

For this purpose, this invention relates to a process of sending data between the computer server 20 and the computer terminal 10. This process is applicable for sending data from the computer terminal 10 to the computer server 20 and from the computer server 20 to the computer terminal 10, and more generally between electronic devices according to the implemented applications using this invention.

Advantageously, the starting of the system client part 13*d* on the computer terminal 10, and then the remote use of the operating system 22*e* and the applications 22*f* hosted by the computer server 20, generate different command and data streams between the computer server 20 and the computer terminal 10, the baud rate of which is controlled and optimised.

Some parts of this command and data stream are already matched to the capabilities of today's consumer communication networks:
  i. Initialisation exchanges between the client part 13*d* and the server part 22*d* of the computer server 20 when the client part 13*d* or the server part 22*d* is started: this bandwidth requirement is low, similar to that commonly used for existing client-server systems (connection, identification or authentication, settings),
  ii. Remote consumption or transfer of Video, Audio or Photos or images: this bandwidth need is now available on consumer communication networks,
  iii. Interactions with keyboards, touch screens, sensors, map and fingerprint readers, GPS by way of example (user or environment interactions with applications): these interfaces generally require relatively low bandwidth.

However, some of this stream as presented in the prior art is not necessarily suitable:
  i. The access to the interactive interfaces of the applications requires the computer server 20 to send a stream dedicated to the graphic display of these interactive interfaces by the driver dedicated to the graphic display of the computer terminal 10 (depending on the client, it may be OpenGL ES, Open GL, Direct3D or Vulkan by way of example). This stream may become significant during the use of some object-rich applications 22*f* and animations, due to the required stream of commands and data becoming significant: several tens to hundreds of Mb/s transit between the application 22*f* and the graphics display driver in some cases, such as when accessing modern video game applications.

The sending process according to this invention contributes to the reduction of this high bandwidth requirement.

In order to adjust the required bandwidth to the stream, i.e. in order to adjust the baud rate, between the computer server 20 and the computer terminal 10 generated by the interactive interface of the remote applications 22*f* for the graphic interface drivers of the computer terminal 10, a new sending process, or even a compression process, must be used, this new sending process comprising, in one embodiment, the use of acceleration variations of the values of the data to be sent allowing the display of this interactive interface.

Indeed, interactive interfaces generally have uniform movements in 2 or 3 spatial dimensions, a proper level of fluidity being generally desired by users, and the values of the data which characterise them generally have uniformly accelerated variations. These values therefore have an often constant acceleration, except during changes of trajectory.

More specifically, sending at a regular interval T of information giving the variations in acceleration of the values of each of the data rather than all their exact values at any time $T(n)$ (as performed by the applications of the current devices with internal operating systems 13*a*, i.e. installed locally on the user terminal 10) decreases the volume of the sent commands, and even allows the computer terminal 10 to display a predictive state before receiving the commands and the data of the time $T(n+1)$ which always arrive one sending time later.

For this purpose, the module of the computer server 20 for sending the commands for driving the graphic display of the applications has to process them at any time $T(n)$ in order to deduce therefrom the variations in the instantaneous accelerations of the values of the various data (positions of objects in 1, 2 or 3 spatial dimensions, transparency, luminosity, filling texture, etc.) and send this information as quickly as possible to the computer terminal 10, which can then easily interpret them and recalculate the exact values of the data at the time $T(n)$, and in the event of constant acceleration predict the probable values at the time $T(n+1)$).

This invention thus relates to a data sending process that reduces the amount of data to be sent without creating losses in their values and that reduces or cancels out the perception of latency through its predictive capability.

In the description of this process below, a series of definitions of several variables are introduced:
  i. D is a data item. It can be an object, a position, a coordinate, a pixel, a voxel, or more generally any type of data.
  ii. A is an attribute of the data item D. For example, it can be a spatial or time-based coordinate, a position, a colour taken from a range of colours, a transparency, a speed of movement, an acceleration, or more generally any type of attribute that a data item can include. It should be noted that a data item D can have several attributes, a first one, a second one, etc. The first attribute can, for example, be an acceleration and the second one a colour.
  iii. $T(n)$ is the nth time. $T=T(n+1)-T(n)$ will be noted as being the period of sending data from the computer server 20 to the computer terminal 10, in particular to the client part 13*d*, (for example, 20 ms in the case of a fluid rendering at 50 frames per second, generally referred to as 50 fps); it is defined by the computer server 20 and will be taken into account by the computer terminal 10 which will wait for new data every T periods, for example.
  iv. T0, $T(n)$, $T(n)$, $T(n+1)$: correspond to the times 0, 1, n, n+1, such that T elapses between 2 consecutive times,
  v. $A(n)$ is a precise state of the attribute A at the time $T(n)$. $A(n)$ can, for example, be a precise position, a precise coordinate, a precise colour taken from a range of colours, a precise transparency coefficient, more generally a precise value from any value that the attribute A can take.
  vi. $E(n)$ corresponds to a change of state parameter from state $A(n)$ to state $A(n+1)$. $E(n)$ is, for example, a change law which can be linear, exponential or any other. $E(n)$ corresponds to a rule for changing the attribute A from the state $A(n)$ to the state $A(n+1)$.
  vii. x corresponds to a 1-dimensional data item whose value changes over time and whose variations are to be sent from the computer server 20 to the computer terminal 10, preferably to the client part 13*d*,
  viii. $x(0)$, $x(1)$, $x(n)$, $x(n+1)$: correspond to the values of x at the beginnings of the times $T(0)$, $T(1)$, $T(n)$, $T(n+1)$, such that $T(n+1)-T(n)$ elapses between 2 consecutive values of x, ix. v(0), v(1), v(n), v(n+1): correspond to the speeds of the variation in the value x at the beginnings of the times T(0), T(1), T(n), T(n+1), such that T(n+1)−T(n) elapses between 2 consecutive values of v, x. a(0), a(n), a(n+1): correspond to the accelerations of the variation in the value of x at the beginnings of the times T(0), T(1), T(n), T(n+1), such that T(n+1)−T(n) elapses between 2 consecutive values of the acceleration, xi. xp(n+1), vp(n+1) and ap(n+1): correspond at the time T(n) to the predictive values of x(n+1), v(n+1) and a(n+1) at the time T(n+1), xii. xc(n+1), xc(n+1) and ac(n+1): correspond at the time T(n+1) to the calculated (or corrected) values of x(n+1), v(n+1) and a(n+1) at the time T(n+1), xiii. At the time T(0), v(0) and a(0) are considered to be zero.

If the data are of the 2- or 3-dimension type such as a position with coordinates x, y, z, this process applies to x, y and z. Indeed, the same reasoning will be applied as for x to y and z.

Figure 3:
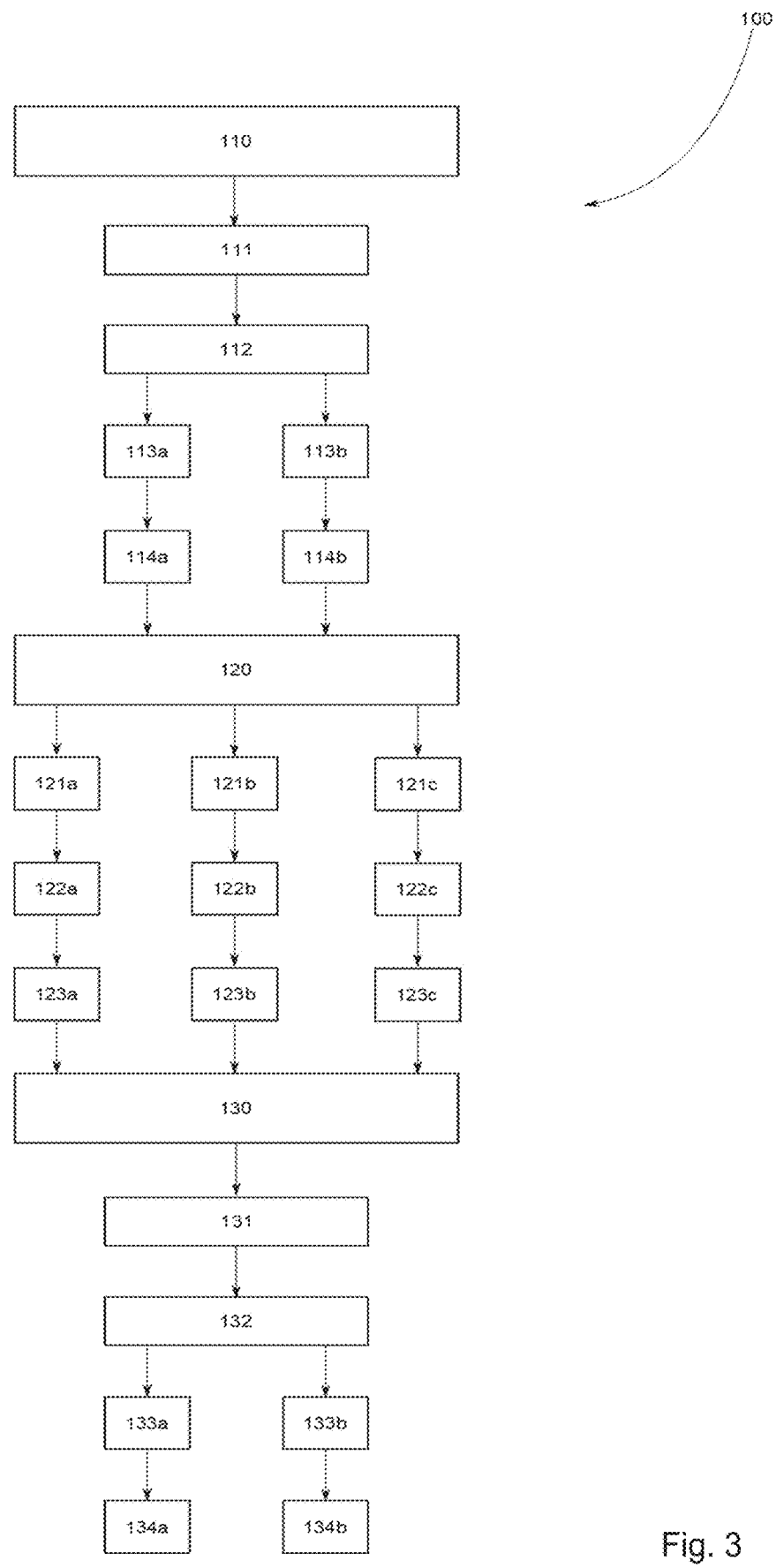
FIG. 3 represents a schematic algorithm of the sending process in one embodiment of this invention.

FIG. 3 represents an algorithm showing the steps implemented by this invention.

The sending process 100, in one embodiment of this invention thus comprises at least two phases and preferably at least three phases:

i. An initialisation phase 110;
ii. A change phase 120;
iii. An optional resynchronisation phase 130.

Advantageously, the initialisation phase 110 makes it possible to identify the data item D at the time T(0) with its attribute A and its state A(0).

Advantageously, the change phase 120 makes it possible to define how the state A(0) of the attribute A of the data item D will change towards A(1), for example.

The resynchronisation phase 130 preferably allows, in the event of accidental interruption of the communication between the computer terminal 10 and the computer server 20, the process of this invention to be continued by resynchronising the data item D with its attribute A in the state A(n) at the time T(n).

In one embodiment, the initialisation phase 110 includes at least the following steps:

i. Receiving 111 by the computer terminal 10 of a data item D from the computer server 20;
ii. Receiving 111 by the computer terminal 10 of a first state A(n) of a first attribute A of the data item D corresponding to a first time T(n) from the computer server 20;
iii. Use 112, for example displaying on the display device 11, by the computer terminal 10 of the data item D according to the first state A(n) of the first attribute A at the first time T(n);
iv. And then receiving by the computer terminal 10:
113a of a second state A(n+1) of the first attribute A corresponding to a second time T(n+1) from the computer server 20,
Then, calculation (114a) by the computer terminal 10 of a first change parameter E(n) of the first attribute A depending on A(n) and A(n+1);
or,
113b of the first change parameter E(n) of the first attribute A from the computer server 20,
Then, calculation 114b by the computer terminal 10 of a second state A(n+1) depending on A(n) and E(n).

It should be noted that the initialisation phase 110 includes two possible branches. Indeed, in one case the computer terminal 10 may receive 111 and 113a a first state A(n) of the attribute A and a second state A(n+1) of the attribute A, and then automatically compute 114a the change parameter E(n) allowing the attribute A to change from A(n) to A(n+1) for a time T(n+1)−T(n). In this case, it is the computer terminal 10 that will locally display, for example, the change in the data item D between A(n) and A(n+1) without receiving other information from the computer server 20.

In another embodiment, the computer terminal 10 may receive 113b a first state A(n) of the attribute A and a change parameter E(n). The second state A(n+1) will then be calculated 114b by the computer terminal 10 locally by applying the change parameter E(n) to the first state A(n) over a period T(n+1)−T(n). In this case again, the computer terminal 10 does not receive any other information from the computer server 20 apart from an initial situation A(n) and a change parameter of the said situation E(n) over the period T=T(n+1)−T(n).

In one embodiment, the data item D may comprise a first attribute A and a second attribute B, for example non-limiting, if the data item D is a pixel, the first attribute A may be the spatial position of the said pixel D and the second attribute B may be the colour of the said pixel D. It should be noted that a colour can be included between two other colours, for example in a time-based stream, a colour can vary and thus, at the time T included between T−1 and T+1, the colour can be different from the one at the time T−1 and the one at the time T+1. In addition, a colour may be digitally coded, for example, on one or more digital scales. A colour can therefore be located between two other colours according to this or these numerical scales. Finally, a colour can also be arranged in a range of colours, such as a range of colours classified according to their frequency or optical wavelength. For example, a first colour between a second and third colour may thus mean that the wavelength of the first colour is between the wavelength of the second colour and the wavelength of the third colour.

In one embodiment, the initialisation phase 110 may be represented, for example, as follows for the branch comprising the reception 113a of the change parameter E(n):

i. At the very beginning of the use of a remote application, at the time T(0):
a. x has the value x0, as decided by an application 22f on the computer server 20, for example,
b. the acceleration a(0) of x(0) cannot be calculated and is considered zero,
c. the rate of change of x called v(0) is considered zero,
d. the computer server 20 sends the computer terminal 10 the actual value of x, i.e. x(0),
e. the computer terminal 10 receives the value x(0) one sending time later,
f. the computer terminal 10 uses the value x(0), for example, to display the point x at the coordinate x(0) through the display device 11, ii. At the next time T(1):
a. The value of x is x(1), as decided by the application 22f on the computer server 20,
b. At the computer server 20 end, a speed v(1) can be calculated which is equal to (x(1)−x(0))/(T(0)−(T1)),
c. At the computer server 20 end, an acceleration a(1) can also be calculated which is equal to (v(1)−v(0))/(T(0)−(T1)),
d. The computer server 20 sends the value a(1) to the computer terminal 10,
e. The computer terminal 10 receives the value a(1) one sending time later, f. The computer terminal 10 can calculate the value of $x(1)=x(0)+½·a(1)*T^2$ g. The computer terminal 10 uses the value $x(1)$, for example, to display the point x at the coordinate $x(1)$, for example, through the display device 11.

This initialisation phase 110 thus enables the computer terminal 10 to receive a data item D having an attribute A in a state $A(0)$ and to be able to display its change to $A(1)$ without continuously receiving a state of A but simply by knowing or deducing from it its change parameter $E(1)$.

Figure 4:
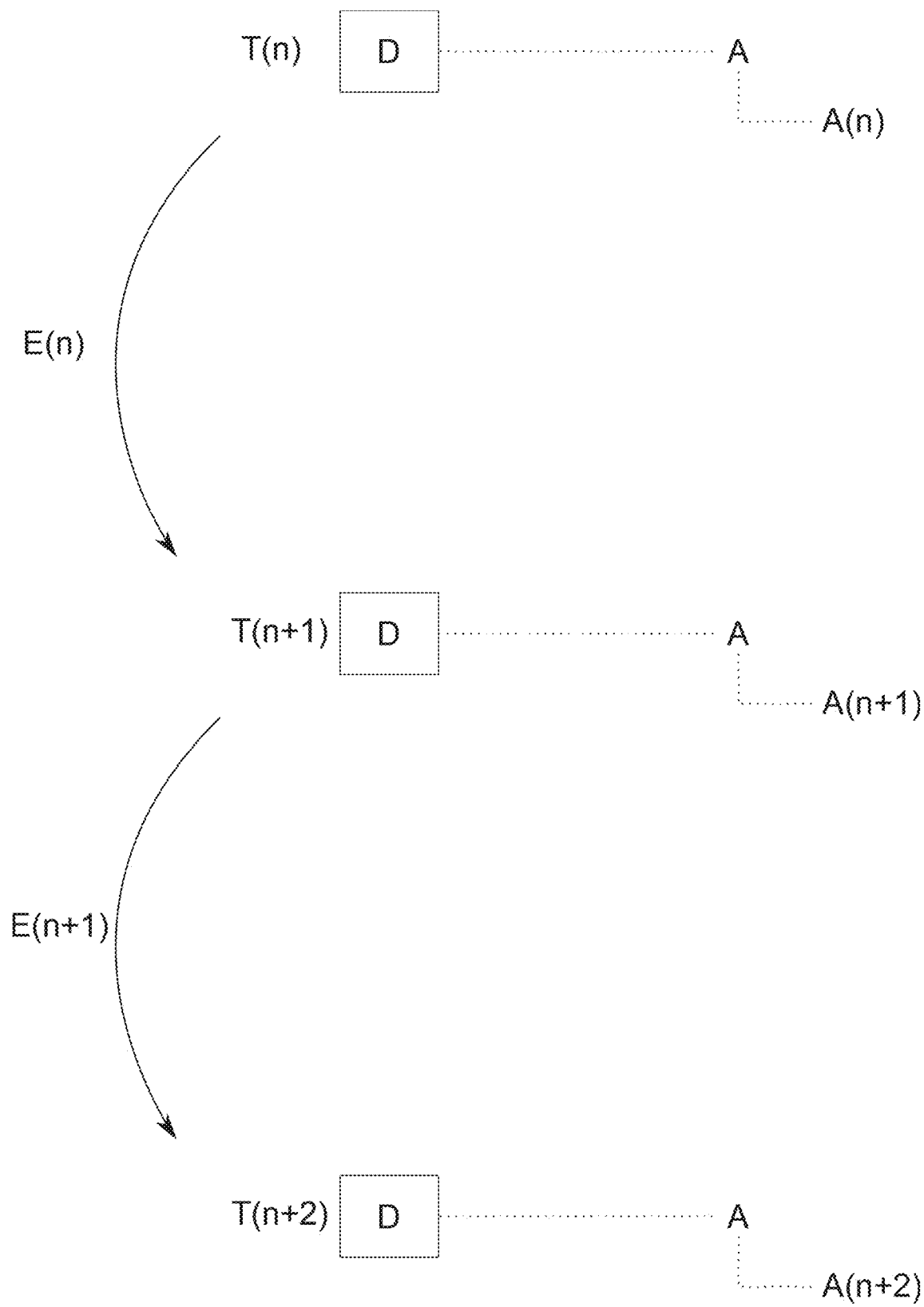
FIG. 4 represents a schematic view of the operation of a part of the sending process in one embodiment of this invention.

FIG. 4 thus exemplifies this change of state of an attribute concept. Indeed, in this figure, at the time $T(n)$, data item D has an attribute A in the state $A(n)$.

By applying the change parameter $E(n)$ received by the computer terminal 10 from the computer server or calculated by the computer terminal 10 on the basis of $A(n)$ and $A(n+1)$, at the time $T(n+1)$, the computer terminal 10 knows the state $A(n+1)$ of the attribute A of the data item D and the change followed by this state between the time $T(n)$ and the time $T(n+1)$.

In the same way, the data item D then sees its attribute A change from the state $A(n+1)$ to $A(n+2)$ according to the change parameter $E(n+1)$ at the time $T(n+2)$.

In one embodiment, the change phase 120 includes at least the following steps:

Use 121a, for example displaying on the display device 11, by the computer terminal 10 of the data item D according to the first state $A(n+1)$ of the first attribute A at the first time $T(n+1)$;

Then, calculation 122a by the computer terminal 10 of a third state $A(n+2)$ of the said first attribute A corresponding to a third time $T(n+3)$ depending on $A(n)$ and/or $A(n+1)$, and $E(n)$;

Use 123a, for example displaying on the display device 11, by the computer terminal 10 of the data item D according to the first state $A(n+2)$ of the first attribute A at the first time $T(n+2)$.

Or, preferably,

Receiving 121b by the computer terminal 10 of a second change parameter $E(n+1)$ of the first attribute A from the computer server 20, where $E(n+1)$ is different from $E(n)$;

Then, calculation 122b by the computer terminal 10 of a third state $A(n+2)$ of the said first attribute A corresponding to a third time $T(n+2)$ depending on $A(n)$ and/or $A(n+1)$, and $E(n+1)$;

Then, use 123b, for example displaying on the display device 11, by the computer terminal 10 of the data item D according to the first state $A(n+2)$ of the first attribute A at the first time $T(n+2)$;

Or, preferably,

Receiving 121c by the said computer terminal of a third state $A(n+2)$ of the said first attribute A at the third time $T(n+2)$ from at least one computer server 20, where $A(n+2)$ is different from $A(n+1)$;

Then, use 121c by the said computer terminal 10 of the said data item D according to the third state $A(n+2)$ of the said first attribute A at the third time $T(n+2)$.

Then, preferably, calculation 122c by the said computer terminal 10 of a third change parameter $E(n+1)$ of the said first attribute A depending on $A(n+1)$ and $A(n+2)$;

Then, preferably, calculation 122c by the said computer terminal 10 of the fourth stage $A(n+3)$ of the said first attribute A at the fourth time $T(n+3)$ depending on $A(n+2)$ and $E(n+1)$ Then, preferably, use 123c by the said computer terminal 10 of the said data item D according to the fourth state $A(n+3)$ of the said first attribute A at the fourth time $T(n+3)$.

This change phase 120 comprises at least two branches and advantageously three branches. The first branch corresponds to a constant change in the state $A(n+1)$ according to the change parameter $E(n)$, the second branch corresponds to a change to the change parameter $E(n)$ of the state $A(n+1)$, and the third branch corresponds to a change to the change parameter $E(n)$ following the reception of a new state $A(n+2)$ In one embodiment, the said first branch may be represented, for example, as follows when a constant change phase, also known as a constant acceleration, occurs:

i. This phase is common for uniformly accelerated variations, as the acceleration $a(n)$ at the time $T(n)$ will be the same as the acceleration $a(n-1)$ at the time $T(n-1)$, ii. At the time $T(n)$:

a. The value of x is $x(n)$, as decided by the application 22f on the computer server 20, b. At the computer server 20 end, an acceleration $a(n)$ is calculated by means of the previous values including $x(n-1)$ which is equal to $a(n)=v(n)-v(n-1)/(T(n)-T(n-1))$, where $v(n)=(x(n)-x(n-1))/(T(n)-T(n-1))$, c. In this phase, the computer server 20 sees that $a(n)$ is equal to $a(n-1)$ previously sent at the time $T(n-1)$ to the computer terminal 10, d. The computer server 20 does not send the value $a(n)$ to the computer terminal 10, e. At the same time $T(n)$, the computer terminal 10 assumes that $a(n)=a(n-1)$, f. The computer terminal 10 uses for $x(n)$: the predictive value $xp(n)$ where $xp(n)=xc(n-1)+vc(n-1)*(T(n-1)-^- T(n))+½·ap(n)*T^2$ where $ap(n)=ac(n-1)$.

g. $a(n-1)$ is the last known value of the acceleration of x by the computer terminal 10, which could either be a corrective value $ac(n-1)$ received from the computer server 20, or a predictive value $ap(n-1)$ depending on this phase at $T(n-1)$.

h. In the end, the computer terminal 10 does not receive a new value for $a(n)$ since it is not sent, as it is constant.

i. The new predictive value $ap(n+1)$ becomes $ap(n)$ which is equal to $a(n)$ and $a(n-1)$ in this phase.

This allows the predictive value $xp(n+1)$ to be calculated and used at the time $T(n+1)$ as is done with $xp(n)$, which has not been sent by the computer server 20 either.

In this case also $xp(n+1)=x(n+1)$.

This invention thus allows the amount of information sent to be decreased to a strict minimum, i.e. a starting point and an ending point, or a starting point and an acceleration vector.

Generally, the prior art proposes either to send a large quantity of information from the computer server 20, or to perform all the calculations locally by hosting the operating system 13a and the applications 13b on the computer terminal 10. This invention takes advantage of the best of both worlds. On the one hand, it allows virtualisation of applications 22f and operating systems 22e with decreased and optimised information sending and with the part of the calculation performed locally on the computer terminal 10 in order to reduce the required bandwidth while benefiting from virtualisation technology.

In one embodiment, the second branch may be represented, for example, as follows when a non-constant change phase occurs:
  i. During this phase, the new acceleration values of x must be sent to the computer terminal 10 so that it can deduce therefrom the new values of x.
  ii. At the time T(n):
      a. The case involved is where the acceleration of x is different from the acceleration of x at the time T(n−1),
      b. The value of x is x(n), as now decided by the application on the computer server 20,
      c. At the computer server 20 end, an acceleration a(n) is calculated which is equal to $a(n)=v(n)-v(n-1)/((T(n)-T(n-1)))^2$ where v(n) which was calculated by $v(n)=(x(n)-x(n-1))/(T(n)-T(n-1)))$,
      d. In this phase, the computer server 20 sees that a(n) is different from a(n−1),
      e. The computer server 20 sends the value a(n) at the time T(n) to the computer terminal 10,
      f. At the same time T(n), as the computer terminal 10 has not yet received the value a(n), it assumes that a(n)=a(n−1) and uses for x the predictive value xp(n) where $xp(n)=xc(n-1)+vc(n-1)*(T(n)-T(n-1))+\frac{1}{2} \cdot ap(n)*(T(n)-T(n-1))^2$ where ap(n)=ap(n−1) and ac(n−1).
      g. a(n−1) is the last known value of the acceleration of x by the computer terminal 10, which could either be a value a(n−1) received from the computer server 20, or a predictive value ap(n−1) depending on this phase at T(n−1).
      h. One sending time later, the computer terminal 10 receives the value a(n) which is in the end different from a(n−1) in the case of this phase, and the computer terminal 10 then calculates the new true value of x where $xc(n)=xc(n-1)+vc(n-1)*(T(n)-T(n-1))+\frac{1}{2} \cdot a(n)*(T(n)-T(n-1))^2$
      i. The computer terminal 10 then corrects the used predictive value xp(n) by the value xc(n) which is equal to x(n).

The new predictive value ap(n+1) becomes a(n) to calculate the predictive value of x(n+1).

In one embodiment, and in a non-limiting manner, the third branch may be represented, for example, as follows when a non-constant change phase occurs:
  i. During this phase, the new values of x are sent to the computer terminal 10 such that it can deduce therefrom the new value of the acceleration a(n+1) of x at the time T(n+1).
  ii. At the time T(n):
      a. The case involved is where the next value x(n+1) of x at the time T(n+1) is sent from the computer server 20 to the computer terminal 10,
      b. At the time T(n), the value of x is x(n),
      c. At the computer server 20 end, a value x(n+1) corresponding to the value of x at the time T(n+1) is sent,
      d. In this phase, the computer terminal 10 then calculates a new acceleration a(n+1) corresponding to the acceleration of x between x(n) at the time T(n) and x(n+1) at the time T(n+1),
      e. The acceleration a(n+1) is equal to $a(n+1)=v(n+1)-v(n)/((T(n+1)-T(n)))^2$ where v(n+1) which was calculated by $v(n+1)=(x(n+1)-x(n))/(T(n+1)-T(n)))$,
      f. With this newly calculated acceleration, the computer terminal 10 can then calculate the next value of x, i.e. xp(n+2) at the time T(n+2), where $xp(n+2)=x(n+1)+v(n+1)*(T(n+1)-T(n+2))+\frac{1}{2} \cdot ap(n+1)*T^2$ where ap(n+1)=a(n+1).

This third branch thus corresponds to the receiving of a new state of the attribute A and by the calculating of a new change parameter E making it possible to reach the said new state. This new change parameter is then used to determine the next states unless a new state or a new change parameter is received by the computer terminal 10.

Again, this invention allows the amount of information sent to be limited so as to reduce the command and data baud rate between the computer terminal 10 and the computer server 20 while maintaining high graphics rendering and very low or zero latency.

In one embodiment, when the communication between the computer terminal 10 and the computer server 20 is accidentally interrupted, for example, a resynchronisation phase 130 is implemented. This synchronisation phase 130 includes at least the following steps:
  i. Receiving 131 by the said computer terminal 10 of the data item D1 from the computer server 20;
  ii. Receiving 131 by the computer terminal 10 of a state A(n+m) of the said first attribute A corresponding to a time T(n+m) from the computer server 20;
  iii. Use 132, for example displaying on the display device 11, by the computer terminal 10 of the data item D1 according to the state A(n+m) of the first attribute A at the first time T(n+m);
  iv. 10 Receiving by the computer terminal:
      133*a* of a state A(n+m+1) of the first attribute A corresponding to a time T(n+m+1) from the computer server 20,
      Then, calculation 134*a* by the computer terminal 10 of a change parameter E(n+m) of the said first attribute A depending on A(n+m) and A(n+m+1);
      or,
      133*b* of the first change parameter E(n+m) of the first attribute A from the computer server 20,
      Then, calculation 134*b* by the computer terminal 10 of the state A(n+m+1) depending on A(n+m) and E(n+m).

This resynchronisation phase 130 is inspired by the initialisation phase 110 in order to reinitialise the state of the attribute A of the data item D when an interruption between the computer terminal 10 and the computer server 20 has occurred.

In one embodiment, the resynchronisation phase 130 may be represented as follows:
  i. This phase 130 is required when a loss of connection and/or reception of several consecutive times is detected depending on the desired service quality;
  ii. This step 130 is required when the client part 13*d* uses predictive values for long periods, or consecutive periods, such that the accuracy of the new predictive value does not become acceptable, for example, if the accuracy used for the sent acceleration may generate an error greater than a predefined value;
  iii. This phase 130 is substantially identical to an initialisation phase 110:
      a. The computer server 20 sends the value x(n) at a time T(n),
      b. The computer server 20 sends the value a(n+1) at the time T(n+1).

If the computer terminal 10 interacts with the computer server 20, it is advantageously possible to use the same sending process in the direction from the computer terminal 10 to the computer server 20 as in the direction from the computer server 20 to the computer terminal 10, for example in the case of sending the control data of a graphical interface of an application used remotely through a smartphone, corresponding to the movements of the user's fingers on the touch screen.

Indeed, in a non-limiting way, and by way of example, the computer terminal 10 may be taken from at least: a smartphone, a desktop or laptop computer, a connected watch or more generally any computer device.

Advantageously, and in one embodiment, as the computer terminal 10 does not know in advance that there is going to be a change in acceleration, it considers that it is in a constant acceleration phase, as this is the most common phase during uniformly accelerated variations.

When the computer terminal 10 does not receive data from the computer server 20 for a time greater than T=T(n)−T(n+1) since the last value received or predicted at the time T(n), it preferably uses the predictive value xp(n+1) from the beginning of the time T(n+1) defined by the constant acceleration phase previously described.

Preferably, when the computer terminal 10 receives a new acceleration value during the time T(n+1), it uses this new value and replaces the predictive value xp(n+1) with this new corrected value xc(n+1) defined by the change phase, also known as the acceleration change phase, as previously described.

Advantageously, in the case of data undergoing uniformly accelerated variations most of the time, this invention will mainly be in constant acceleration phases most of the time: the amount of data to be sent will be considerably decreased (no new information to be sent to the computer terminal 10 during the constant acceleration phases).

It is then in an acceleration change phase 120 of the variations in the values (corresponding to a change of trajectory when spatial coordinates are involved, for example), or in the initialisation phase 110 or resynchronisation phase 130 (during error management or loss of connection, for example), that the computer server 20 will have to send new data values to the computer terminal 10.

In addition, as the variations in acceleration are relatively small when this involves sending a model representing the movement of interfaces or graphic scenes of digital representation of a real or virtual world, or with which a user can interact, the it may be best to choose to send the variation in acceleration between T(n+1) and T(n), i.e. a(n+1)−a(n−1) rather than a(n+1), in order to reduce as far as possible the amount of information sent, and the bandwidth used between the computer terminal 10 and the computer server 20. This makes it possible to choose the minimum format defined by the maximum possible amplitude between 2 accelerations in the model to be sent. This choice can be automated according to the features of the communication network used or manually adjusted by users, for example.

This invention provides a zero or very low perception of sending latency through the use of predictive values: at each time T(n), the computer terminal 10 already knows predictive values of positions, speeds, and/or accelerations at the time T(n+1): i.e. xp(n+1), vp(n+1), and ap(n+1). In the case of uniformly varied data to be sent, the computer terminal 10 will thus be able to anticipate the likely values at subsequent times and thus allow, for example, users of a remote application to interact with their graphical interface at the earliest possible time, after their interaction command has been sent to the computer server 20.

This process can even simulate a zero sending time if it is less than the defined period T(n+1)−T(n).

This invention is shown below by means of several examples illustrated in FIGS. 5 to 7.

Figure 5:
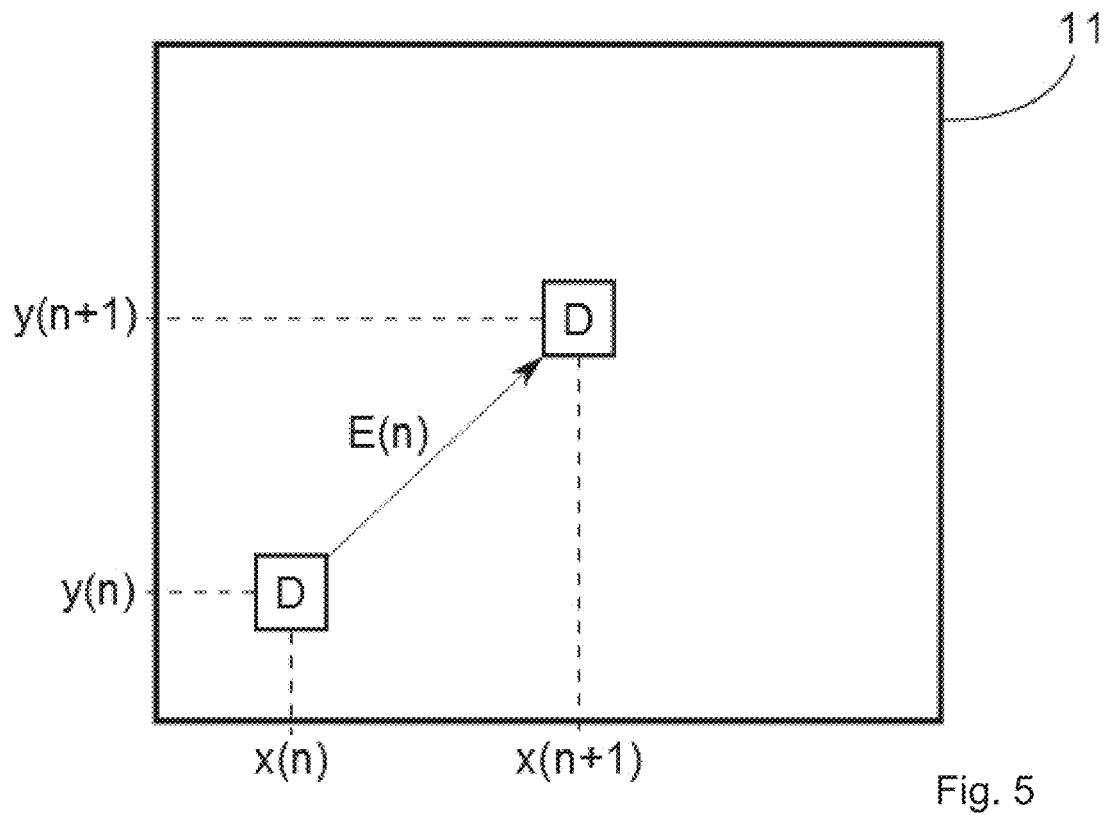
FIG. 5 represents an example of the implementation of the sending process in one embodiment of this invention.

FIG. 5 represents, according to the display device 11 of the computer terminal 10. The data item D, in this case a pixel or a group of pixels or a voxel or a group of voxels, is represented at the point of coordinates x(n), y(n) at the time T(n). In this situation, the attribute A of the data item D may include the position of the data item D on the display screen, so A(n)=(x(n), y(n)).

According to a first embodiment, the computer terminal 10 has received the change parameter E(n) of the attribute A(n) so that it is able to determine A(n+1) without receiving any other information from the computer server 20. Given E(n), the computer terminal 10 can also calculate A(n+1) from A(n) by applying E(n) to it. So that E(n) allows x(n+1) to be obtained from x(n) and y(n+1) from y(n).

According to a second embodiment, the computer terminal 10 has received the state A(n+1) of the attribute A(n) so that it is able to determine E(n) without receiving any other information from the computer server 20. Given A(n+1), and preferably, but without limitation, given the generic change law, the computer terminal 10 can also calculate E(n) from A(n) and A(n+1). So the trajectory, i.e. the set of coordinates (x,y), that the object D will follow between A(n) and A(n+1) will be calculated after deduction of E(n). According to this embodiment, as the starting point and the end point are known, it only remains to determine the trajectory to be followed, i.e. E(n).

The generic change law is one or more rules allowing the determining change parameter E(n) to be determined from A(n) and A(n+1). Indeed, there are many paths to reach A(n+1) from A(n). Paths, for example, following a linear or non-linear progression, which can also be exponential, etc. Also, according to an embodiment, it is advisable to define at least one generic rule relating to the change law to be applied.

Figure 6:
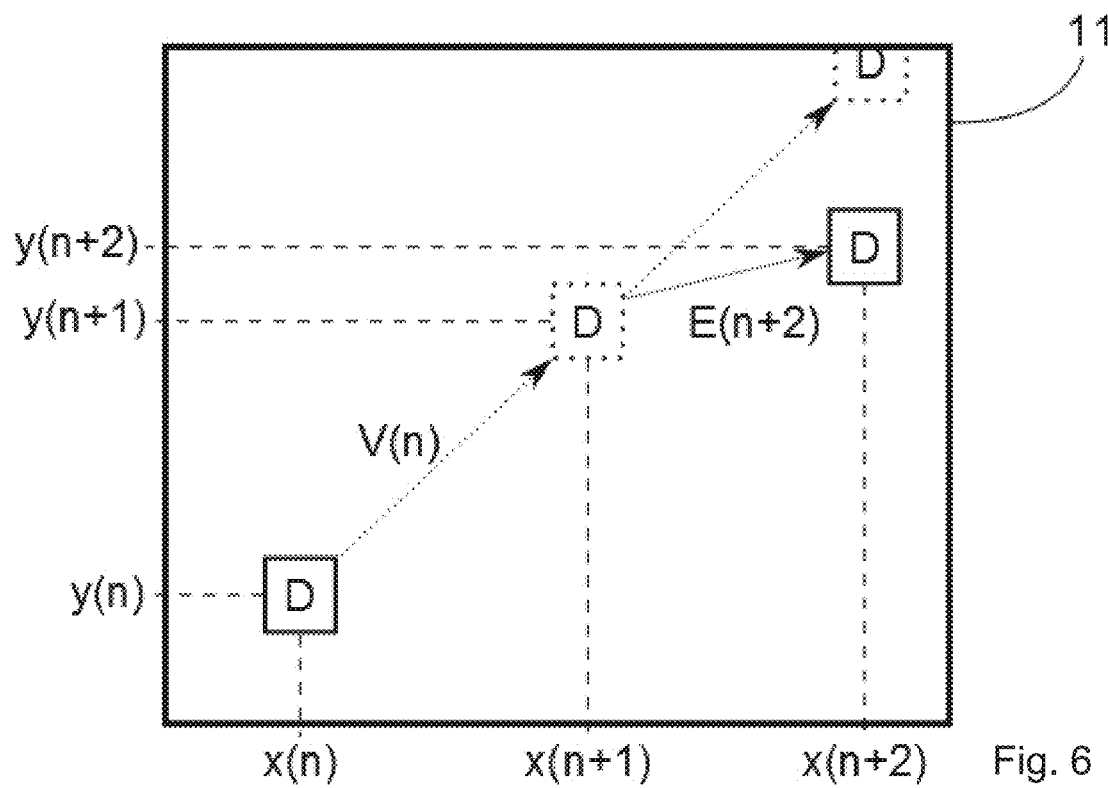
FIG. 6 represents an example of the implementation of the sending process in one embodiment of this invention.

FIG. 6 represents, in one embodiment, the display device 11 of a computer terminal 10. This display device 11 displays, at a time T(n), a data item D in the form of a voxel for example whose attribute A is a spatial position and whose state A(n) of the said attribute A at the time T(n) corresponds to the coordinates x(n) and y(n). In one embodiment, the computer terminal 10 has received, in addition to the state A(n) for the data item D, a speed vector v(n) enabling the computer terminal 10 to assess and thus predict the future positions of the said voxel D unless counter-ordered by the computer server 20, for example.

Also, at the time T(n+1), the attribute A of voxel D has the state A(n+1)=(x(n+1), y(n+1)). The voxel D is therefore located at the coordinates x(n+1) and y(n+1) on the display device.

Preferably, the various positions between A(n) and A(n+1) have been calculated and displayed based on v(n) by the computer terminal 10. Here v(n) corresponds to the change parameter E(n).

According to the example shown in FIG. 6, at the time T(n+1), for example, the computer terminal 10 receives a change parameter E(n+2) thus correcting the previous change parameter corresponding to v(n).

By applying the new change parameter E(n+2), the voxel D thus changes its trajectory and no longer follows a uniform rectilinear path, but deviates according to the new information received. It follows that, in the absence of a new state of the attribute A, the voxel D will continue its movement according to the last received change parameter.

Figure 7:
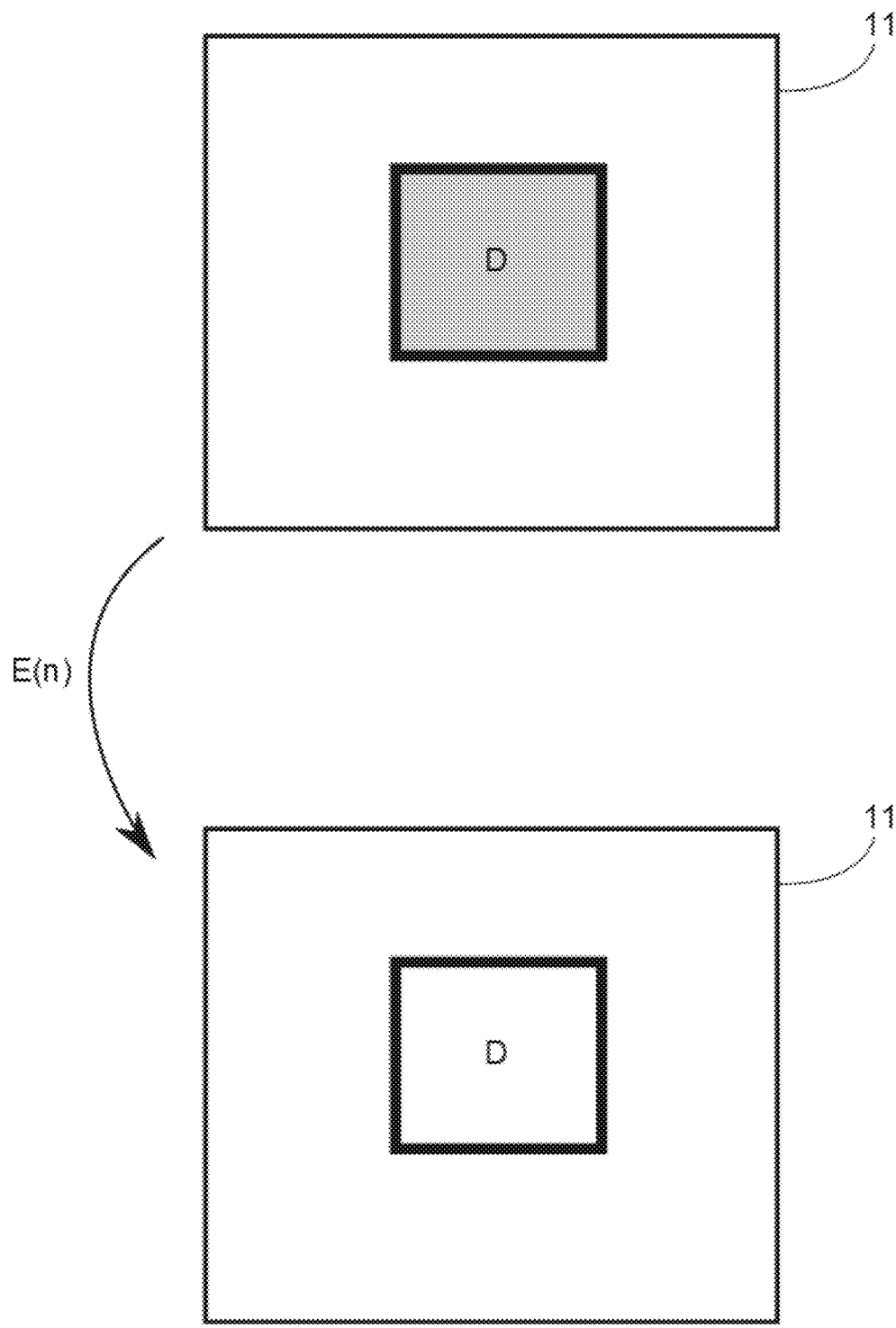
FIG. 7 represents an example of the implementation of the sending process in one embodiment of this invention.

FIG. 7 represents an example of the implementation of one embodiment of this invention. According to this example, the attribute A of the data item D corresponds to the transparency level of the object D. Also, the state $A(n)$ corresponds to a transparency coefficient of the object D at the time $T(n)$.

According to this example, the application of a change parameter $E(n)$, for example, leads to a change in the state $A(n)$ such that at the time $T(n+1)$, $A(n+1)$ is different from $A(n)$, and according to this example, is greater than $A(n)$, such that the object D is thus more transparent at the time $T(n+1)$ than at the time $T(n)$.

These examples are by no means limiting. This invention can be applied to all types of data and all types of attributes. The analogy to a position, a speed and an acceleration is for illustrative purposes only.

This invention allows the reduction of the production cost and consumption of terminals. Indeed, this invention decreases the memory and power requirements of current electronic devices which, according to this invention, no longer need to store and run applications and operating systems locally. As mentioned above, an often very large part of the non-volatile memory of electronic devices in the prior art is used to store the operating system and installed applications. This invention makes it possible to relocate them to one or more computer servers and thus significantly reduce the memory requirements of terminals.

This will inevitably result in a drop in the manufacturing costs of new computer terminals based on this invention since the sizes of the non-volatile and even sometimes volatile memories required for their operation will be decreased.

This invention also decreases the power consumption of terminals since most of the algorithmic processing is relocated on one or more computer servers.

In one advantageous embodiment of this invention, an electronic circuit is also configured to enable the implementation of the previously disclosed process. This electronic circuit can either be included in the manufacturing of the terminals or added to existing terminals via any interface, for example USB, Network, PCMCIA, etc.

In one embodiment, the electronic circuit comprises at least one processor, at least one non-transitory memory storing a computer program product including instructions executable by the said at least one processor, with the said instructions being configured to run at least in part the process according to this invention.

Advantageously, this electronic circuit is intended to be included in a new type of processor, thus making it possible to obtain high-performance hardware architectures that are optimised in terms of cost, size and power consumption.

This invention also provides many advantages in terms of maintenance. Indeed, since operating systems, applications and services are relocated on one or more computer servers, terminals no longer need to update them and are no longer dependent on them. The computer server(s) are responsible for updating all operating systems and/or applications. Cleverly, it is even possible to make all versions of an operating system available remotely.

In one embodiment of this invention, the interaction between the computer server and the computer terminal can be made accessible to any support entity, and control can be taken of any computer terminal in place of its user through its privileged server access. It is then easier for a support centre to monitor the operation of terminals, and to help a user to use operating systems and applications remotely.

Cleverly, this invention means that no changing or matching of the application is needed. For the supplier of an application, no effort is thus required to adapt their application to this invention. In addition, there is less need to test an application on all versions of the operating systems used or on all terminals, or to impose the use or installation of a new version of an operating system to be installed by users on their computer terminals. With this invention, an application will be remotely operational for all terminals as long as it runs on a selected version of the preferred operating system.

In one embodiment of this invention, low latency, high quality teleconferencing and/or broadcasting solutions can be implemented.

In one embodiment of this invention, a low latency, high quality teleconferencing solution can be created, wherein:

i. Each computer terminal acts as a client and a server, ii. each computer terminal is provided with an image sensing system, preferably a video sensing system, and advantageously a real-time 3D modelling system. This makes it possible to represent a person, their face and the objects that surround them in real time through 3D digital objects, for example, iii. each computer terminal sends, through a communication network such as the Internet, commands, data, animations and changes in the representation of the 3D model using the process described in this invention.

According to another embodiment, this invention provides a real-time solution for broadcasting events with high quality and low latency. This is achieved using the same method as the previous video conferencing solution, but in a one-way mode. Indeed, preferably only one computer terminal acts as a computer server and serves a set of client terminals. Here only the server computer terminal must be provided with the image sensing, video or 3D modelling system.

In one embodiment of this invention, better synchronised and high-quality collaborative applications can be obtained. According to the prior art, while many collaborative applications including multi-player games are now available, the fluidity and responsiveness of their interfaces are often of poor quality. However, this invention allows the development of and access to new collaborative applications of much better quality. Indeed, all the context-sensitive interfaces of users are centralised in the application running on the computer server and are generated simultaneously for all the users who interact with each other and with these applications through their respective terminals.

In one embodiment of this invention, static data compression solutions can also be implemented. The invention's sending process can be used to compress static data, or even to store static data, particularly if they represent a sequence of data whose values undergo generally uniformly accelerated variations.

In one embodiment of this invention, a data compression process is involved. This data compression process can be implemented and operated independently of the sending process described and claimed in this application.

In one embodiment, the time sequence previously described by $T(n)$ can be replaced by a spatial dimension $P(n)$ defining the position in a position sequence of a static data item. The sending at certain $T(n)$ of data is thus not obtained, but variations for certain $P(n)$ of static data values. Based on an example, the method of manufacturing the electromechanical microsystem system may include the following steps:

i. the initialisation phase includes:
   a. Saving of a first value corresponding to the first value of the static data,
   b. Saving of a second value corresponding to the acceleration of the second value of the static data,
ii. Constant acceleration phases include:
   a. Monitoring of the value of the said acceleration or its variation,
   b. Monitoring of a number which represents the number of positions during which the said acceleration remains constant, with the number of positions corresponding to the number of consecutive static data.
   c. Saving of a third value corresponding to the said number of positions during which the acceleration remains constant.
iii. Acceleration change phases include:
   a. Monitoring of the value of the new acceleration or its variation
   b. The next value is equal to the new acceleration or its variation from the previous acceleration value,
   c. Saving of a fourth value corresponding to the said new acceleration.
   d. In one embodiment, the fourth value is equal to 1 if this phase is again followed by an acceleration change phase.

Values are preferably saved by a storage device. This storage device comprises a preferably non-transitory saving medium. This storage device can for example be a hard disc, a USB key, a memory card, a memory or more generally any medium capable of storing at least one computer data item. In this description, a memory device refers to a memory.

This data compression process described above can be implemented and operated independently of the sending process described and claimed in this application.

This compression process, also known as the compression step or phase, does not encode the exact values of a data sequence, but only the relative variations of each value with respect to the previous one, for example.

This is equivalent to saving a starting numerical value, and then subsequently encoding only the changes in acceleration, i.e. the changes in the rate of change between each value, relative to the positions of the said values. A starting point is thus obtained followed by the parameters of a trajectory defining the other values to be compressed according to the starting point and their relative variations.

This is equivalent to only indicating changes of direction to drivers on a road and not indicating every metre that they should continue straight on, for example.

This compression process, or compression step or phase, can thus be used in combination with the sending process so as to send the data only in a compressed form, for example.

In one embodiment, this compression process can be used for saving data in a compressed form.

In one embodiment of this invention, the sending process can be supplemented by a step of sending, from the computer terminal or from a device in communication with the computer server, a control data item intended to change the data item D, preferably the attribute A of the data item D, advantageously the state A(n) of the attribute A of the data item D at the time T(n), and/or the change parameter E(n) at the time T(n).

Advantageously, this sending step makes it possible to send data to the computer server which may or may not influence the data received by the computer terminal from the computer terminal and/or from any device in communication with the said computer server.

This embodiment is particularly applicable to set-top boxes which are not uplinked to a computer server, e.g. television set-top boxes, which receive their display data from the computer server through a satellite network, but which are not capable of sending instructions from users to the computer server. In this type of situation, this invention allows users to send data and/or instructions through, for example, a computer or a smart phone to the computer server independently of the computer terminal which in this case happens to be the television set-top box, by way of example.

An embodiment, compatible with the previous ones and shown through FIGS. 8 to 18, is described below.

According to this embodiment, and as previously stated, if the data are 2- or 3-dimension type, such as a position with coordinates x, y, z, this invention may apply to x, y and z.

If the client, also called terminal 10, interacts with the computer server 20, this invention can be used both to send data from the client 10 to the computer server 20 and the other way round, i.e. from the computer server 20 to the client 10. For example, it may be the sending of control data of the graphical interface of an application used remotely through a smartphone, corresponding to the movements of the user's fingers moving on the touch screen.

FIGS. 8, 9, 10, 19a, 19b and 19c describe the phases of the sending process in one embodiment of this invention.

Figure 8:
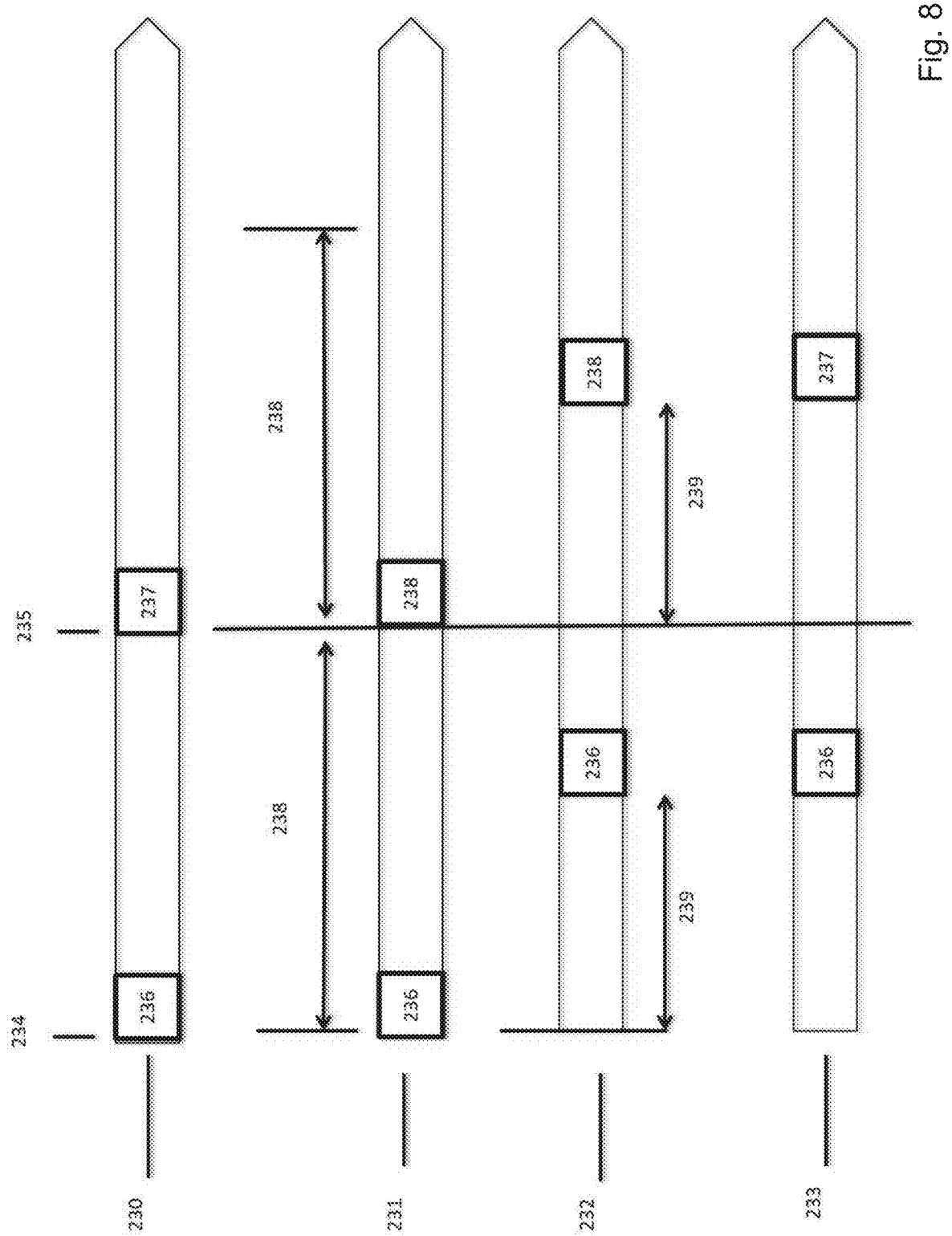
FIG. 8 represents a diagram illustrating an initialisation phase in one embodiment of this invention.
Figure 9:
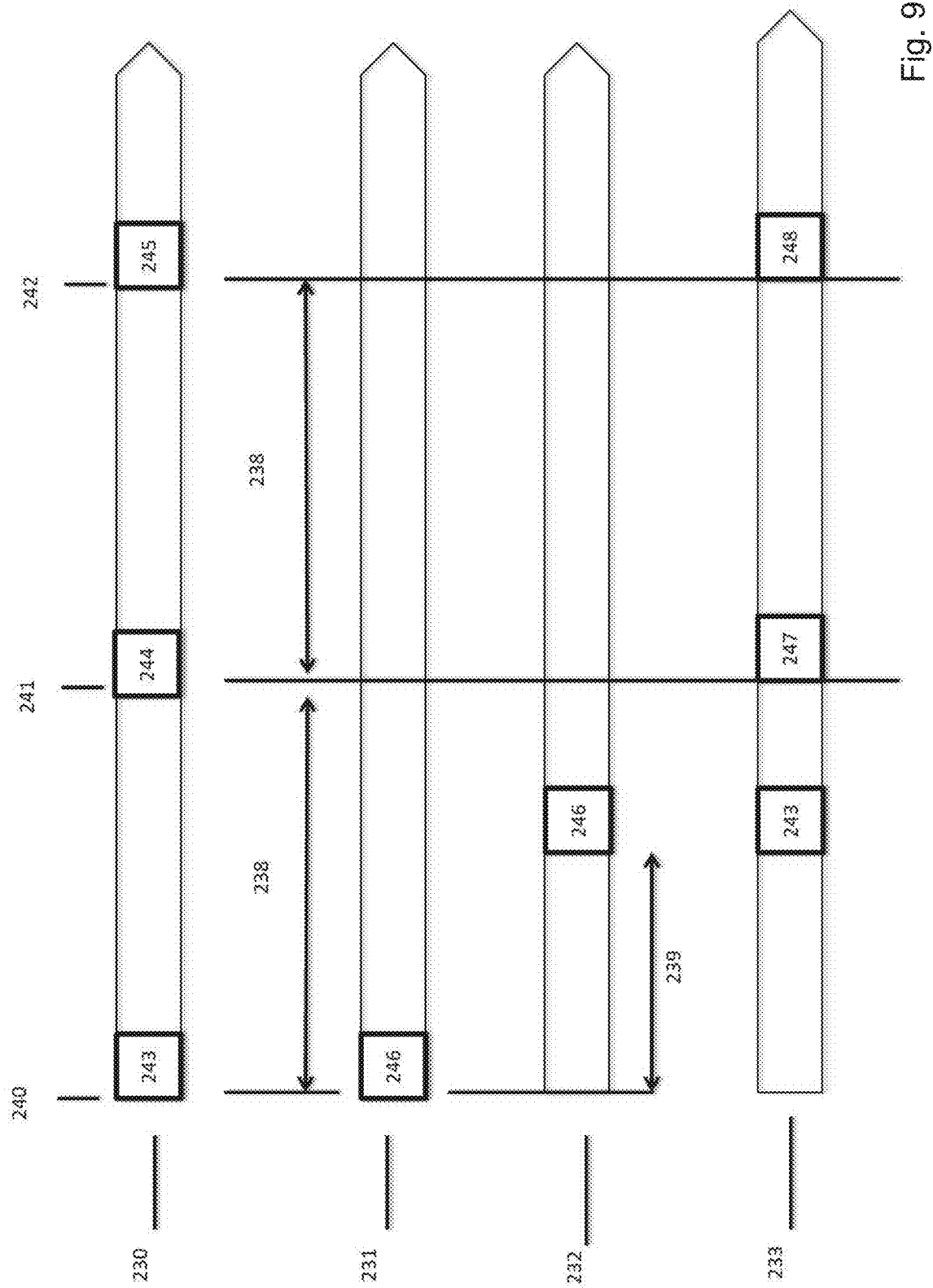
FIG. 9 represents a diagram illustrating a constant acceleration phase in one embodiment of this invention.
Figure 10:
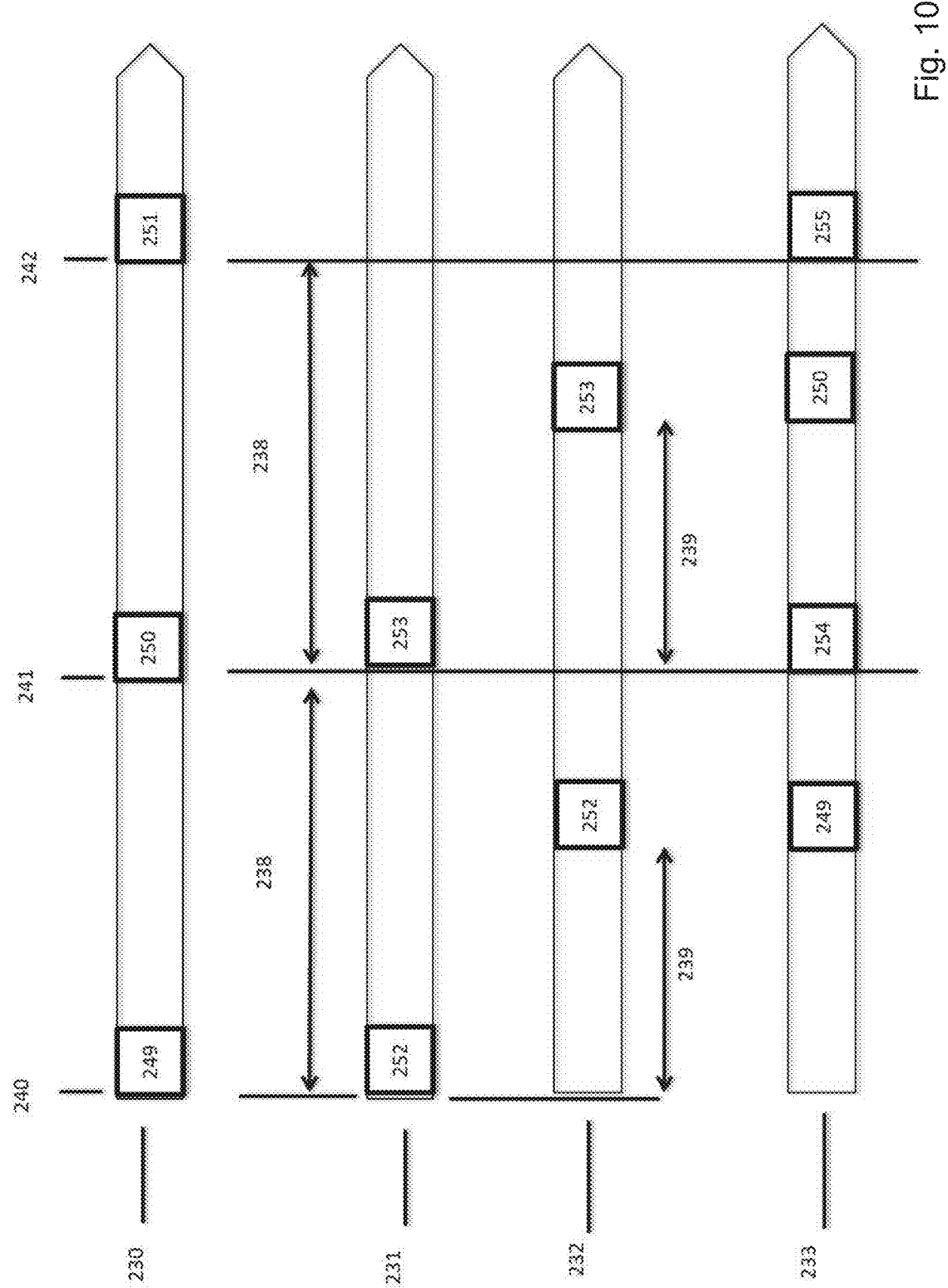
FIG. 10 represents a diagram illustrating an acceleration change phase in one embodiment of this invention.

In one embodiment, the sending process preferably comprises 4 types of phases which will be described in a narrative way in order to explain the operation as well as possible:

i. An initialisation phase (at T0, T1) as shown in FIG. 8; this phase comprises at least the following steps:
   a. At the very beginning of the use of a remote application, at the time T0 (234):
      x has the value x0 (236), as defined (230) on the computer server 20, for example, by the application,
      the acceleration a0 of x0 cannot be calculated and is considered zero,
      the rate of change of x called v0 is considered zero, the computer server 20 sends (231) the client 10 the actual value of x, i.e. x0 (236),
      the client 10 receives (232) the value x0 (236) one sending time later (239),
      the client 10 uses (233) the value x0 (236), for example, to display the point x at the coordinate x0,
   b. At the next time T1 (235):
      The value of x is x1 (237) as defined (230) on the computer server 20, for example by the application,
      At the computer server 20 end, a speed v1 can be calculated which is equal to (x1−x0)/T, where T is the period (238),
      At the computer server 20 end, an acceleration a1 (238) is calculated which is equal to v1/T,
      The computer server 20 sends (231) the value a1 (238) to the client 10,
      The client 10 receives (232) the value a1 (238) one sending time later (239),
      The client 10 can calculate the value of x1=x0+ ½·a1·T^2
      The client 10 uses (233) the value x1 (237), for example, for the purpose of displaying the point x at the coordinate x1, ii. One or more constant acceleration phases, as shown in FIG. 9, including at least the following steps:
   a. It should be noted that during these phases, which are the most common for uniformly accelerated variations, the acceleration a(n) at the time T(n) (241) will be the same as the acceleration a(n−1) at the time T(n−1) (240).
   b. At the time T(n) (241):
      The value of x is x(n) (244) as defined (230) on the computer server 20, for example by the application,
      At the computer server 20 end, an acceleration a(n) is calculated from the previous values including x(n−1) (243) which is equal to a(n)=v(n)−v(n−1)/T^2 where v(n) was calculated by v(n)=(x(n)−x(n−1))/T),
      In this phase, the computer server 20 sees that a(n) is equal to a(n−1) (246) previously sent (231) at T(n−1) (240),
      The computer server 20 do not send (231) the value a(n) to the client 10,
      At the same time T(n) (241), the client 10 assumes that a(n)=a(n−1),
      The client 10 uses (233) for x: the predictive value xp(n) (247) where xp(n)=xc(n−1)+vc(n−1)*T+½*ap(n)*T^2 where ap(n)=ac(n−1);
   a(n−1) is the last known value of the acceleration of x by the client 10, which could either be a value received by the computer server 20 a(n−1), or a predictive value ap(n−1) depending on the phase of T(n−1). In this case xp(n) (247)=x(n) (244) to the nearest approximation error.
   In the end, the client 10 does not receive a new value for a(n) since it is not sent. The new predictive value ap(n+1) becomes ap(n) which is equal to a(n) and a(n−1) in this phase;
   In this phase, the predictive value xp(n+1) (248) is calculated and used (233) at the time T(n+1) (242) as is done with xp(n) (247), which has not been sent by the computer server 20 either. In this case also xp(n+1) (248)=x(n+1) (245) to the nearest approximation error.
   i. One or more acceleration change phases, as shown in FIG. 10, including at least the following steps:
      a. During these phases, the new acceleration values of x must be sent to the client 10 so that it can deduce therefrom the new values of x.
      b. At the time T(n) (241):
         The case involved is where the acceleration of x is different from the acceleration of x at the time T(n−1) (240),
         The value of x is x(n) (250) as defined (230) on the computer server 20, for example by the application,
         At the computer server 20 end, an acceleration a(n) (253) is calculated which is equal to a(n)=v(n)−v(n−1)/T^2 where v(n) which was calculated by v(n)=(x(n)−x(n−1))/T),
         In this phase, the computer server 20 sees that a(n) is different from a(n−1) (252),
         The computer server 20 sends (231) the value a(n) (253) at the time T(n) (241),
         At the same time T(n) (241), the client 10 has not yet received the value a(n) (253), assumes that a(n)=a(n−1) and uses (233) for x in the predictive value xp(n) (254) where:
   xp(n)=xc(n−1)+vc(n−1)*T+½*ap(n)*T^2 where ap(n)=ap(n−1) or ac(n−1);

a(n−1) is the last known value of the acceleration of x by the client 10, which could either be a value received by the computer server 20 a(n−1) (252), or a predictive value ap(n−1) depending on the phase of T(n−1). According to FIG. 10, a situation is schematically represented where the computer server 20 would have sent a(n−1) (252) to the client 10, but this would not be the case if the time T(n−1) (240) corresponded to a constant acceleration phase;
   One sending time later, the client 10 receives the value a(n) (253) which is in the end different from a(n−1) in the case of this phase, and calculates the new true value of x where xc(n)=xc(n−1)+vc(n−1)*T+½*a(n)*T^2 (250)
   The client 10 then corrects (233) the used predictive value xp(n) (254) by the value xc(n) (250) which is equal to x(n).
   The new predictive value ap(n+1) becomes a(n) to calculate the predictive value of xp(n+1) (255).
   Also, at the computer server (230) end, the value of x (251) at the time T(n+1) (242) will or will not cause the sending (231) of a new acceleration value of x, implying or otherwise the correcting the predictive value xp(n+1) (255) one sending time later.
   i. One or more resynchronisation and/or error correction phases including at least the following steps:
      a. This phase is required when the computer server 20 and/or the client 10 detects a loss of connection and/or receiving of several consecutive periods depending on the desired service quality;
      b. This phase is required when the client 10 uses predictive values for long periods consecutive periods, such that the accuracy of the new predictive value does not become acceptable; This may be the case, for example, if the accuracy used for the sent acceleration may generate an error greater than a predefined value or threshold predetermined by the sending configuration;
      c. This phase is substantially identical to an initialisation phase:
         The computer server 20 sends the client 10 the value x(n) at a time T(n), as when x0 was sent at the time T0;
         The computer server 20 sends the client 10 the value a(n+1) at the time T(n+1), as when a1 was at the time T1.
   In one embodiment of this invention compatible with the previously disclosed embodiments, the operation of the client 10 and the detection of phase changes is described below:
      i. As the client 10 does not know in advance that there is going to be a change in acceleration, it considers that it is in a constant acceleration phase, such as previously described as this is the most common phase during uniformly accelerated variations,
      ii. If the client 10 does not receive anything for a time greater than T since the last value received or predicted at the time T(n), it uses the predictive value xp(n+1) from the beginning of the period T(n+1) defined by the constant acceleration phase,
      iii. If the client 10 receives a new acceleration value during the period T(n+1), it uses this new value and replaces the predictive value xp(n+1) with this new corrected value xc(n+1) defined by the acceleration change phase.

The impact on the baud rate of a sending implemented by this invention is illustrated below:
  i. In the case of data undergoing uniformly accelerated variations most of the time, the system implementing this invention is then mainly in constant acceleration phases most of the time: the amount of data to be sent is considerably decreased since there is no new information to be sent to the client 10 during the constant acceleration phases;
  ii. It is only in an acceleration change phase of the variations in the values corresponding to a change of trajectory when coordinates are involved, for example, or in the initialisation phase or resynchronisation phase, during error management or loss of connection, for example, that the computer server 20 will have to send new data values to the computer terminal 10;
  iii. Advantageously, the useful size of the data to be sent is smaller in the general cases of prior art data sending:
    a. For example, if the values or positions are 4 bytes long, and the acceleration is 1 byte long: the useful size is divided by 4;
    b. For example, if the values or positions are 4 bytes long, and the acceleration is 2 bytes long: the useful size is divided by 2.
  iv. Advantageously, as the variations in acceleration are relatively small when this involves sending a model representing the movement of interfaces or graphic scenes of digital representation of a real or virtual world, or even with which a user can interact, the system may be configured to send the variation in acceleration between $T(n+1)$ and $T(n)$, i.e. $a(n+1)-a(n-1)$ rather than $a(n+1)$, in order to reduce as far as possible the need for the information to be sent, and thus choose the minimum format defined by the maximum possible amplitude between two accelerations in the model to be sent.

The impact on the latency and perception of sending times through the use of this invention is illustrated below:
  i. The process according to this invention provides a zero or very low perception of sending latency through the use of predictive values: at each time $T(n)$, the client 10 already has predictive values of positions, speeds, and accelerations at the time $T(n+1)$: i.e. $xp(n+1)$, $vp(n+1)$, and $ap(n+1)$.
  ii. In the case of uniformly varying data to be sent by the computer server 20, the client 10 can anticipate the likely values at subsequent times and thus allow, for example, users of a remote application to interact with their graphical interface at the earliest possible time, after their interaction command has been sent to the computer server 20 by the client 10.
  iii. This process according to this invention can also simulate a zero sending time if it is less than the defined period T.

FIGS. 19a, 19b and 19c show, a chronological synthesis of at least a part of the steps involved in the process in one embodiment of this invention. In particular, FIG. 19a shows, in one embodiment, the various states of the data as well as the commands sent to the client, also known as the terminal, by the computer server according to the period T considered. Likewise, FIG. 19b shows, in one embodiment, the commands received by the client from the computer server and the actions performed according to the period T considered. FIG. 19c represents the caption corresponding to FIGS. 19a and 19b in one embodiment of this invention.

Figure 11:
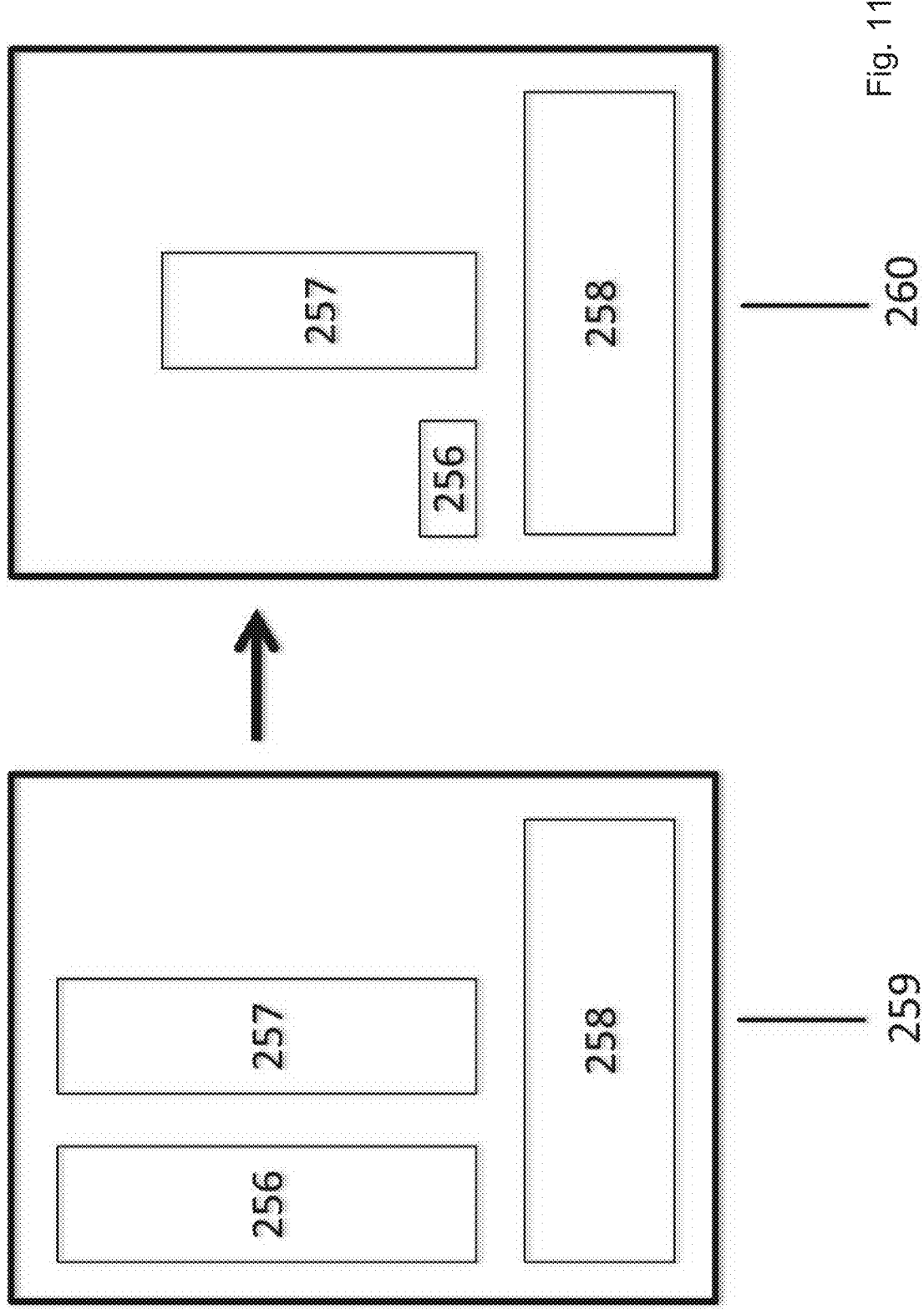
FIG. 11 represents a diagram illustrating an advantage provided by one embodiment of this invention.
Figure 12:
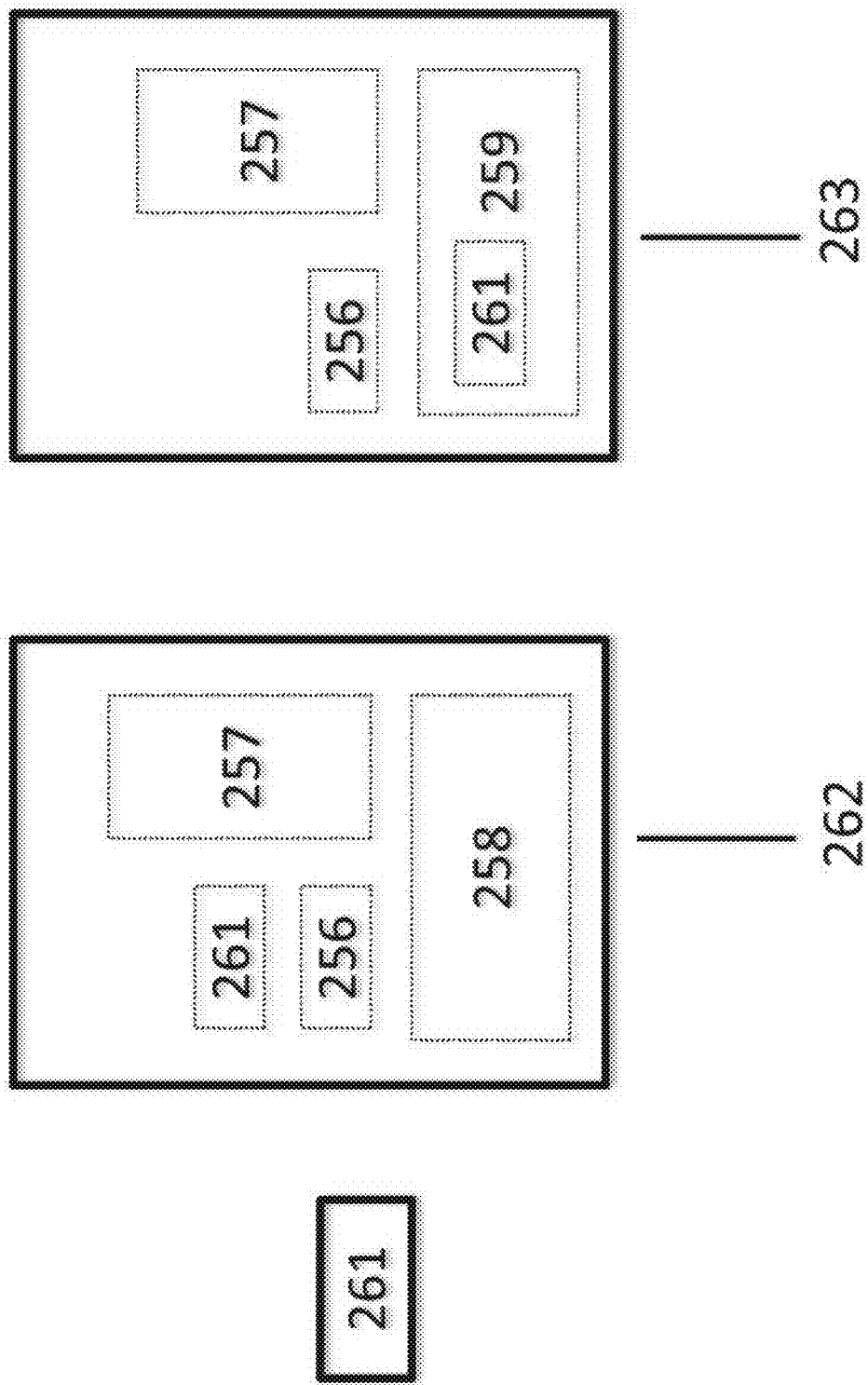
FIG. 12 represents a diagram illustrating an advantage provided by one embodiment of this invention.
Figure 13:
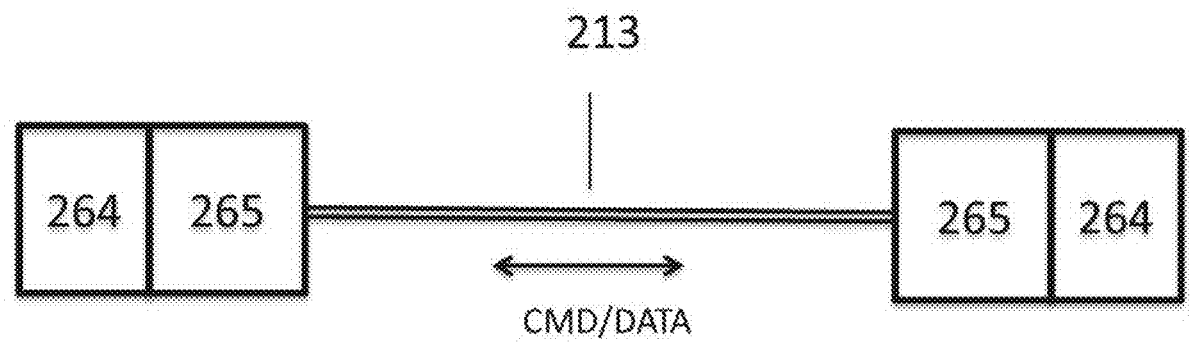
FIG. 13 represents a diagram illustrating an example of the application of one embodiment of this invention.
Figure 14:
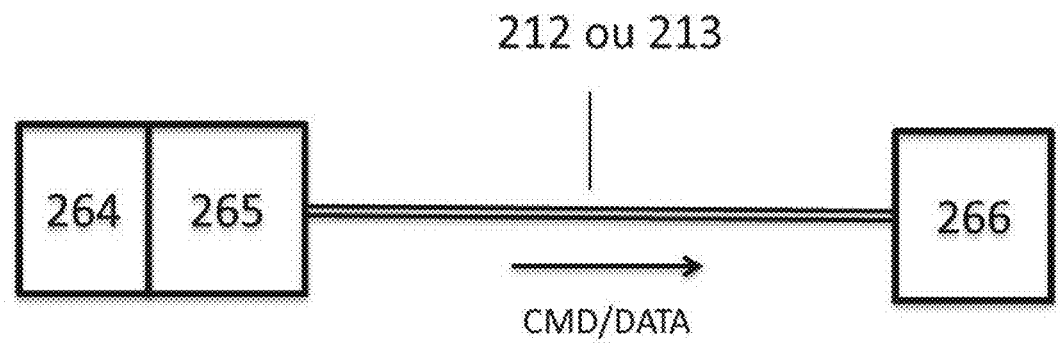
FIG. 14 represents a diagram illustrating an example of the application of one embodiment of this invention.

Some of the advantages of this invention are illustrated below:

i. Reduction in the cost and consumption of devices in the short term, as shown in FIG. 11:
    a. This invention decreases the memory and power requirements of current electronic devices (259) which then no longer need to store and run locally, through a processor (258), an operating system, for example, and/or applications. An often very large part of the non-volatile memory of electronic devices is today used to store the operating system and installed applications. The memory requirements of these devices can therefore be significantly decreased by relocating them. The costs of manufacturing new devices (260) based on this invention are decreased since the sizes of the non-volatile memories (256) and even sometimes volatile memories (257) required for their manufacturing are decreased.
    b. This invention makes it possible to decrease the power consumption of electronic devices. Indeed, there is preferably no operating system and/or applications running locally, nor are there other applications running in the background on the electronic device as in current prior art devices. This therefore decreases the power consumption of electrical devices using this invention.
  ii. Second optimisation in the cost of devices, i.e., clients 10, and computer servers 20, as shown in FIG. 12:
    a. In one embodiment of this invention, several addition and/or multiplication calculations may be required when used in certain applications. Cleverly, this invention also relates to an electronic circuit (261) that allows these calculations to be managed so as not to congest the main processors of the electronic devices as regards the clients 10. In one embodiment, this can also be applied on the computer server side 20. This electronic circuit can either be included in the manufacturing of the electronic devices (262, 263), or added to existing devices through an interface, such as USB, Network, PCMCIA, etc., by way of example.
    b. This dedicated electronic circuit can preferably be included in new processors (259), thus making it possible to obtain high-performance hardware architectures that are optimised in terms of cost, size and power consumption.
  iii. The maintenance of electronic devices, i.e. clients 10, operating systems and applications is facilitated:
    a. Since operating systems, applications and services are relocated, clients 10 no longer need to update them and are no longer dependent on them. The computer server 20 updates all operating systems or applications in such a way that it is even possible to make all versions of an operating system available remotely to one or more clients 10;
    b. Advantageously, any technical support component may, for example, access interchanges between the computer server 20 and the client 10, and even to take control of any client 10 in place of its user through its privileged "server access". It is then easier for a technical support centre to monitor the operation of clients 10, and for example to help a user to use operating systems and/r applications remotely.
    c. Cleverly, no effort is required from the supplier of an application to match its application to the operating system or client. There is therefore less need to test it on all versions of the operating systems used or on all electronic products; Through this invention, the supplier's application is remotely operational for all devices, i.e., clients 10 also known as terminals 10, as long as the application runs on a selected version of the preferred operating system.

iv. High quality, low latency teleconferencing or broadcasting application, as shown in FIGS. 13 and 14:

a. In the prior art, there are systems currently available for 3D, real-time modelling of real scenes. By coupling these systems (264) with this invention, and in particular to its sending process, it is possible to provide a high-quality, low-latency teleconferencing solution, as shown in FIG. 13:

In one embodiment, each electronic device (265) acts as both a client 10 and a computer server 20, Each electronic device is provided with a real-time 3D sensing and modelling system (264): this makes it possible to represent a person, their face and the objects that surround them in real time through 3D digital objects, Through this invention, each electronic device sends commands, data (CMD/DATA), animations and changes in the representation of the 3D model, through a communication network (213);

And/or a low-latency, high-quality, real-time event retransmission solution, as shown in FIG. 14:

Using the same method as for the previous video conferencing solution, but in a one-way mode.

Figure 15:
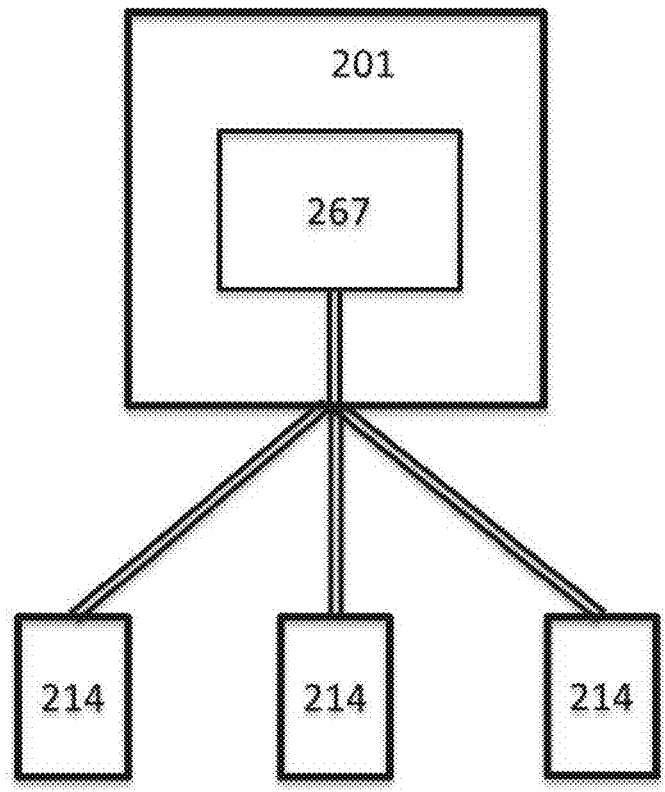
FIG. 15 represents a diagram illustrating an example of the application of one embodiment of this invention.
Figure 16:
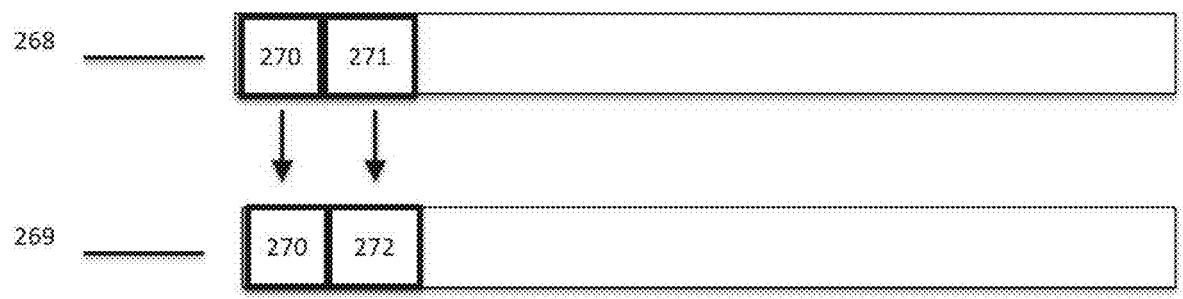
FIG. 16 represents a diagram illustrating an example of the application of one embodiment of this invention.
Figure 17:
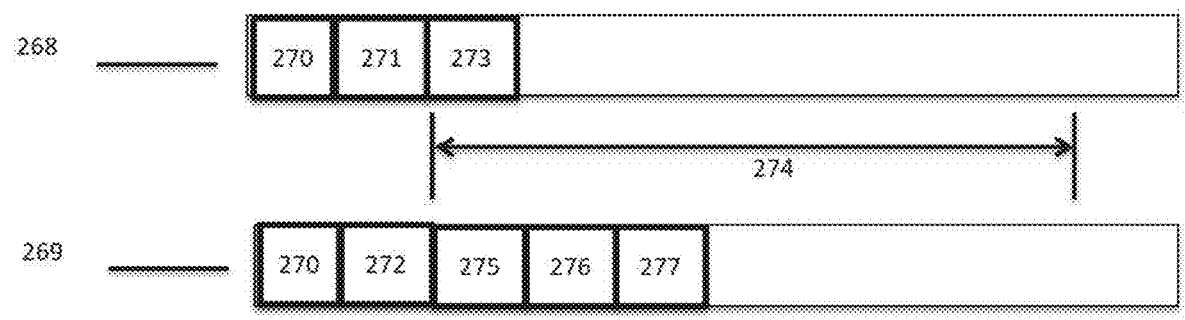
FIG. 17 represents a diagram illustrating an initialisation phase in an example of the application of one embodiment of this invention.
Figure 18:
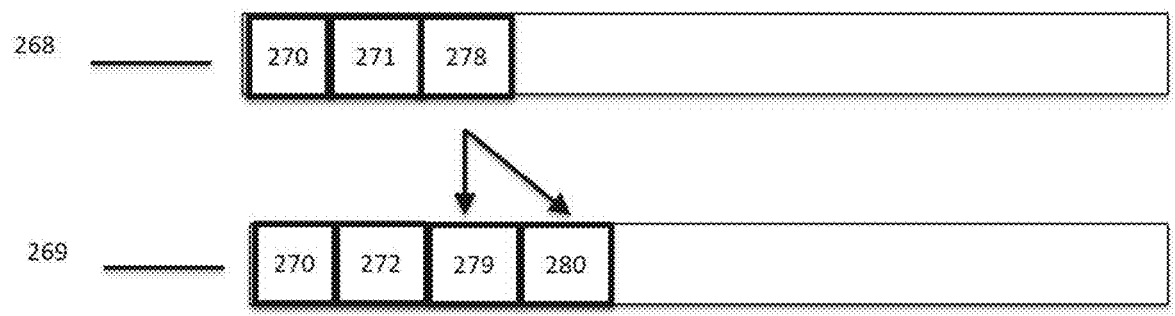
FIG. 18 represents a diagram illustrating a constant acceleration phase in an example of the application of one embodiment of this invention.

For example, only one sender (265) serving a set of clients 10 (266) is then provided with the 3D sensing and modelling system (264).

v. Better-synchronised and high-quality collaborative applications, as shown in FIG. 15:

a. While many collaborative applications including multi-player video games are now available, the fluidity and responsiveness of their interfaces are often of poor quality;

b. Through the sending process described in this invention, it is now possible to develop and access new collaborative applications (267) of much better quality. Indeed, all the context-sensitive interfaces of users can be centralised in the application running on the computer server 20 (201) and be generated simultaneously for all the users who interact with these applications through their client electronic devices 10 (214).

vi. Application for the compression of static data, as shown in FIGS. 16 to 18:

a. This invention can be used to compress, preferably static, data, and in particular if they represent a sequence of data whose values undergo generally uniformly accelerated variations;

b. For this purpose, the time periods corresponding to the times when data are to be sent or not, depending on the phase considered, are replaced in the process by the position of the data in the data sequence to be compressed (268); This invention thus allows a digital file to be compressed (268) into a compressed digital file (269);

c. The steps in the process described in this invention then have to be applied so that the sending process becomes a compression process by establishing a new compressed sequence (269) of the said data.

d. The initialisation phase, as shown in FIG. 16, is defined as follows:

The first value of the file to be compressed (268) is kept (270) in the compressed file (269), The second value (272) of the compressed file is equal to the acceleration between the first value (270) and a second value (271) of the file to be compressed (268), e. The constant acceleration phases (274), as shown in FIG. 17, are identified by:

a constant acceleration phase identifier (275), followed by the value of the acceleration or its variation (276), followed by a number that represents the number of positions during which the acceleration remains constant (277).

f. The acceleration change phases, as shown in FIG. 18, are identified by:

an acceleration change identifier (279) between the second value (271) of the file to be compressed and the third value (278) of the file to be compressed, followed by the value of the new acceleration or its variation (280), g. The resynchronisation phases may not be required in this application case since data compression is involved rather than sending.

This invention thus enables data to be compressed using the sending process between a data source which may be a non-transitory medium, for example, or a real-time data collection source, and a storage device comprising a non-transitory medium capable of storing the data sent through the sending process of this invention.

One embodiment of this invention can also be used for data analysis. In particular, this invention allows the formatting of data through the compression process providing an enhanced form suitable for a specific analytical interest.

In one embodiment of this invention, the data sent by the process are analysed by an analysis device. An analysis device may include at least one processor and at least one data storage medium. This analysis device is configured to perform one or more analyses based on the sent data. One of the advantages of this invention is then a decreased analysis time as the analysis device can focus its system resources on analysing relevant data in a data stream, or even on analysing variations in this data instead of the data itself. This analysis method can speed up the data processing time in many application areas.

The invention is not limited to the previously described embodiments and extends to all embodiments covered by the claims.

REFERENCES

10 Computer terminal
11 Display device
12 Processor
13 Memory
13*a* Operating system
13*b* Applications
13*c* Personal data
13*d* Client part
14 Battery
15 Communication module
16 User interface
20 Computer server
21 Processor
22 Memory
22*a* Installation file
22*b* Update file
22*c* Personal data 22d Server part
22a Operating system
22f Applications
23 Communication module
31 Receiving by the computer terminal
32 Sending by the computer terminal
100 Sending process
110 Initialisation phase
111 Receiving by the said computer terminal of the said data item D of a first state A(n) of the said first attribute A corresponding to a first time T(n) from at least one computer server
112 Use by the said computer terminal of the said data item D according to the first state A(n) of the said first attribute A at the first time T(n)
113a Receiving by the said computer terminal of a second state A(n+1) of the said first attribute A corresponding to a second time T(n+1) from at least one computer server
113b Receiving by the said computer terminal of the first change parameter E(n) of the said first attribute A from at least one computer server
114a Calculation by the said computer terminal of a first change parameter E(n) of the said first attribute A depending on A(n) and A(n+1)
114b Calculation by the said computer terminal of the second state A(n+1) depending on A(n) and E(n)
120 Change phase
121a Use by the said computer terminal of the said data D according to the second state A(n+1) of the said first attribute A at the second time T(n+1)
121b Receiving by the said computer terminal of a second change parameter E(n+1) of the said first attribute A from at least one computer server
121c Receiving by the said computer terminal of a third state A(n+2) of the said first attribute A at the third time T(n+2) from at least one computer server, where A(n+2) is different from A(n+1); then, use by the said computer terminal of the said data item D according to the third state A(n+2) of the said first attribute A at the third time T(n+2).
122a Calculation by the said computer terminal of a third state A(n+2) of the said first attribute A corresponding to a third time T(n+3) depending on A(n) and/or A(n+1), and E(n)
122b Calculation by the said computer terminal of a third state A(n+2) of the said first attribute A corresponding to a third time T(n+2) depending on A(n) and/or A(n+1), and E(n+1)
122c Calculation by the said computer terminal of a third change parameter E(n+1) of the said first attribute A depending on A(n+1) and A(n+2); then, calculation by the said computer terminal of the fourth stage A(n+3) of the said first attribute A at the fourth time T(n+3) depending on A(n+2) and E(n+1).
123a Use by the said computer terminal of the said data D according to the third state A(n+2) of the said first attribute A at the third time T(n+2)
123b Use by the said computer terminal of the said data according to the third state A(n+2) of the said first attribute A at the third time T(n+2)
123c Use by the said computer terminal of the said data D according to the fourth state A(n+3) of the said first attribute A at the fourth time T(n+3).
130 Resynchronisation phase
131 Receiving by the said computer terminal of the said data item D1 of a state A(n+m) of the said first attribute A corresponding to a time T(n+m) from at least one computer server
132 Use by the said computer terminal of the said data item D1 according to the state A(n+m) of the said first attribute A at the time T(n+m)
133a Receiving by the said computer terminal of a state A(n+m+1) of the said first attribute A corresponding to a time T(n+m+1) from at least one computer server
133b Receiving by the said computer terminal of a change parameter E(n+m) of the said first attribute A from at least one computer server
134a Calculation by the said computer terminal of a change parameter E(n+m) of the said first attribute A depending on A(n+m) and A(n+m+1)
134b Calculation by the said computer terminal of the state A(n+m+1) depending on A(n+m) and E(n+m).

The invention claimed is:

1. A process for sending from at least one computer server to at least one computer terminal at least one data item D having at least one time-dependent first attribute A that changes over time from a first state A(n) corresponding to a first time T(n) to a second state A(n+1) corresponding to a second time T(n+1), and changes over time from the second state A(n+1) corresponding to the second time T(n+1) to a third state A(n+2) corresponding to a third time T(n+2), with the said at least one computer server being in communication with the said computer terminal, with the said process including at least the following successive phases:
  I. at least one initialization phase including at least the following steps:
    a. receipt by the said computer terminal from at least one computer server of at least:
      the said data item D;
      the first state A(n) of the said first attribute A corresponding to the first time T(n);
    b. use by the said computer terminal of the said data item D according to the first state A(n) of the said first attribute A at the first time T(n);
    c. receipt by the said computer terminal:
      of the second state A(n+1) of the said first attribute A corresponding to the second time T(n+1) from at least one computer server,
      then, calculation by the said computer terminal of a first change parameter E(n) of the said first attribute A depending on A(n) and A(n+1), wherein the first change parameter E(n) corresponds to the change of state of the first attribute A from the first time T(n) to the second time T(n+1),
      of the first change parameter E(n) of the said first attribute A from at least one computer server,
      then, calculation by said computer terminal of the second state A(n+1) depending on A(n) and E(n);
  ii. at least one change phase including at least one iteration of the following steps:
    a. use by the said computer terminal of the said data item D according to the second state A(n+1) of the said first attribute A at the second time T(n+1);
    b. then, calculation by the said computer terminal of the third state A(n+2) of the said first attribute A corresponding to the third time T(n+2) depending on A(n) and/or A(n+1), and E(n);
    c. then], use by the said computer terminal of the said data item D according to the third state A(n+2) of the said first attribute A at the third time T(n+2);

d. during the steps of the change phase, with the first change parameter E(n) being changed to a second change parameter E(n+1), if:
  the said computer terminal receives a second change parameter E(n+1) of the said first attribute A from at least one computer server, E(n+1) different from E(n); the said calculation by the said computer terminal of the third state A(n+2) corresponding to the third time T(n+2) then depending on A(n) and/or A(n+1) and E(n+1);
e. in the change phase steps, with the second state A(n+1) being changed to a third state A(n+2), and the first change parameter E(n) being changed to a second change parameter E(n+1) if:
  the said computer terminal receives from the at least one computer server a third state A(n+2) of the said first attribute A corresponding to a third time T(n+2), the change phase then comprising the calculation of a second change parameter E(n+1) of the said first attribute A, depending on A(n+1) and A(n+2),
and wherein the use by the said computer terminal of the said data item D is taken from at least: displaying of the said data item D through a display device, storing of the said data item D through a storage device, or analyzing of the said data item D through an analysis device,
wherein the said at least one attribute A is taken from at least: a position, a speed, or an acceleration, and
wherein the change parameter is taken from at least: a speed, an acceleration, or a trajectory.

2. The process according to claim 1 wherein the third state A(n+2) is equal to E(n)*(T(n+2)−T(n+1))+A(n+1).

3. The process according to claim 2 wherein the second change parameter E(n+1) is equal to (A(n+2)−A(n+1))/(T(n+2)−T(n+1)).

4. The process according to claim 1 wherein the third state A(n+2) is equal to E(n)*(T(n+1)−T(n))+A(n).

5. The process according to claim 4 wherein the second change parameter E(n+1) is equal to (A(n+2)−A(n))/(T(n+2)−T(n)).

6. The process according to claim 5, wherein A(n+1) is between A(n) and A(n+2).

7. The process according to claim 1 wherein the use by the said computer terminal of the said data item D includes at least one step of displaying the said data item D.

8. The process according to claim 1 wherein the use by the said computer terminal of the said data item D includes at least one step of storing the said data item D.

9. The process according to claim 8 wherein the use by the said computer terminal of the said data item D includes at least one step of analyzing the said data item D.

10. The process according to claim 1, wherein the said data is taken from at least: a pixel, a voxel, a numerical value, an object, or an image.

11. The process according to claim 1, wherein the said at least one first attribute A is further taken from at least: a color taken from a range of colors, or a transparency coefficient.

12. The process according to claim 1 wherein the first state, the second state and the third state are taken from at least: a numerical value, spatial coordinates, a speed vector, an acceleration vector, a color taken from a range of colors, or a transparency coefficient.

13. The process according to claim 1 wherein the first change parameter E(n) is equal to (A(n+1)−A(n))/((T(n+1)−T(n)).

14. The process according to claim 1 wherein the second state A(n+1) is equal to E(n)*(T(n+1)−T(n))+A(n).

15. The process according to claim 1 wherein the step of receipt by the said computer terminal of the said data item D from at least one computer server and the step of receipt by the said computer terminal a first state A(n) of the said first attribute A corresponding to the first time T(n) from at least one computer server are performed in one and the same step.

16. The process according to claim 1 including a resynchronization phase including at least the following steps:
  I. receipt by the said computer terminal of the said data item D from at least one computer server;
  ii. receipt by the said computer terminal of a state A(n+m) of the said first attribute A corresponding to a time T(n+m) from at least one computer server, wherein m represents an interval where an interruption between the computer terminal and the computer server occurred;
  iii. use by the said computer terminal of the said data item D according to the state A(n+m) of the said first attribute A at the time T(n+m);
  iv. receipt by the said computer terminal:
    of a state A(n+m+1) of the said first attribute A corresponding to a time T(nt+m+1) from at least one computer server,
    then, calculation by the said computer terminal of a first change parameter E(n+m) of the said first attribute A depending on A(n+m) and A(n+m−+1);
    or,
    of a change parameter E(n+m) of the said first attribute A from at least one computer server,
    then, calculation by the said computer terminal of the state A(n+m+1) depending on A(n+m) and E(n+m).

17. The process according to claim 1 further comprising a phase of compressing a plurality of data including at least the following steps:
  I. at least one initialization sub-phase comprising:
    a. saving in at least one memory, of a first value corresponding to the first value of the plurality of data,
    b. saving in at least one memory, of a second value corresponding to the acceleration of the second value of the plurality of data,
  ii. at least one constant acceleration sub-phase comprising:
    a. monitoring of the value of the said acceleration or its variation,
    b. monitoring of a number which represents the number of positions during which the said acceleration remains constant, with the number of positions corresponding to the number of consecutive data items of the plurality of data having a constant acceleration,
    c. saving in at least one memory, of a third value corresponding to the said number of positions during which the acceleration remains constant,
  iii. at least one acceleration change phase comprising:
    a. monitoring of the value of the new acceleration or its variation,
    b. the next value is equal to the new acceleration or its variation from the previous acceleration value,
    c. saving, in at least one memory, of a fourth value corresponding to the said new acceleration.

18. An electronic circuit comprising a plurality of electronic components and comprising at least one processor configured to run a series of commands implementing the process according to claim 1.

19. A computer terminal including at least one electronic circuit according to claim 18.

20. The computer terminal according to claim 19 including at least one user interface, at least one display device and at least one communication module to communicate with at least one computer server.

21. A system including at least one computer terminal according to claim 19 and at least one computer server, with the said computer terminal and the said computer server being in communication with each other.

22. A computer program product, saved on a non-transitory medium, comprising instructions, which when performed by at least one of a processor and a computer, cause the at least one of the processor and the computer to run the process according to claim 1.

* * * * *